US009817844B2

(12) United States Patent
Ko

(10) Patent No.: US 9,817,844 B2
(45) Date of Patent: Nov. 14, 2017

(54) AEROMAGNETIC PRE-PROCESSING SYSTEM BASED ON GRAPHIC USER INTERFACE AND PRE-PROCESSING METHOD USING THE THEREOF

(71) Applicant: Korea Resources Corporation, Seoul (KR)

(72) Inventor: Gwang Beom Ko, Gyeonggi-do (KR)

(73) Assignee: KOREA RESOURCES CORPORATION, Seoul (KR)

( * ) Notice: Subject to any disclaimer, the term of this patent is extended or adjusted under 35 U.S.C. 154(b) by 0 days.

(21) Appl. No.: 14/904,105

(22) PCT Filed: Feb. 25, 2015

(86) PCT No.: PCT/KR2015/001787
§ 371 (c)(1),
(2) Date: Jan. 11, 2016

(87) PCT Pub. No.: WO2015/156499
PCT Pub. Date: Oct. 15, 2015

(65) Prior Publication Data
US 2016/0171010 A1  Jun. 16, 2016

(30) Foreign Application Priority Data
Apr. 10, 2014  (KR) ........................ 10-2014-0043180

(51) Int. Cl.
*G01C 21/00*  (2006.01)
*G06F 17/30*  (2006.01)
(Continued)

(52) U.S. Cl.
CPC ....... *G06F 17/30241* (2013.01); *G01C 23/00* (2013.01); *G06F 3/048* (2013.01);
(Continued)

(58) Field of Classification Search
CPC ............. G06F 17/30241; G06F 3/0481; G06F 3/04847; G06F 17/30601; G06F 17/30312; G08G 5/0034
(Continued)

(56) References Cited

U.S. PATENT DOCUMENTS

| 4,686,474 A * | 8/1987 | Olsen ........................ G01V 1/22 324/331 |
| 4,814,711 A * | 3/1989 | Olsen ...................... G01V 3/165 324/331 |
| 2008/0125920 A1 * | 5/2008 | Miles .................... B64C 39/024 701/2 |

FOREIGN PATENT DOCUMENTS

| KR | 10-2008-0036717 A | 4/2008 |
| KR | 10-1348787 B1 | 1/2014 |

OTHER PUBLICATIONS

International Search Report for PCT/KR2015/001787 dated May 29, 2015 from Korean Intellectual Property Office.
(Continued)

*Primary Examiner* — Muhammad Shafi
(74) *Attorney, Agent, or Firm* — Revolution IP, PLLC

(57) ABSTRACT

An aeromagnetic pre-processing system based on a graphic user interface (GUI) includes an input unit for inputting measured aeromagnetic data, GPS data, and reference magnetic data, a data storage unit for storing individual data, collection data, and edition data on division area data groups obtained after an investigation area is divided, a GUI providing unit for providing a GUI for data input/output, an operation unit for performing an operation to perform pre-processing for each of the division area data groups and collection and leveling of the division area data groups, and a controller for controlling the input unit, the data storage unit, the GUI providing unit, and the operation unit.

6 Claims, 25 Drawing Sheets

(51) Int. Cl.
   *G06F 3/048*      (2013.01)
   *G01C 23/00*      (2006.01)
   *G06T 11/20*      (2006.01)
   *G06F 3/0481*     (2013.01)
   *G06F 3/0484*     (2013.01)
   *G08G 5/00*       (2006.01)

(52) U.S. Cl.
   CPC ........ *G06F 3/0481* (2013.01); *G06F 3/04847* (2013.01); *G06F 17/30* (2013.01); *G06F 17/30312* (2013.01); *G06F 17/30601* (2013.01); *G06T 11/206* (2013.01); *G08G 5/0034* (2013.01)

(58) Field of Classification Search
   USPC ........................................................ 701/410
   See application file for complete search history.

(56) References Cited

OTHER PUBLICATIONS

Ko, Kwang Beom et al. "A 3D Magnetic Inversion Software Based on Algebraic Reconstruction Technique and Assemblage of the 2D Forward Modeling and Inversion". Geophysics and Geophysical Exploration, 2013, vol. 16, No. 1, pp. 27-35.

Shin, Eun Ju et al. "A Case Study on the Data Processing and Interpretation of Aeromagnetic Survey Conducted in the Low Latitude Area: Stung Treng, Cambodia". Geophysics and Geophysical Exploration, 2012, vol. 15, No. 3, pp. 136-143.

* cited by examiner

FIG. 11B

AEROMAGNETIC PRE-PROCESSING SYSTEM BASED ON GRAPHIC USER INTERFACE AND PRE-PROCESSING METHOD USING THE THEREOF

CROSS REFERENCE TO PRIOR APPLICATIONS

This application is a National Stage Application of PCT International Patent Application No. PCT/KR2015/001787 filed on Feb. 25, 2015, under 35 U.S.C. §371, which claims priority to Korean Patent Application No. 10-2014-0043180 filed on Apr. 10, 2014, which are all hereby incorporated by reference in their entirety.

BACKGROUND

The present invention relates to an aeromagnetic pre-processing system based on a graphic user interface (GUI) and a pre-processing method using the same, and more particularly, to an aeromagnetic pre-processing system based on a GUI and a pre-processing method using the same, which can provide a method of visualizing and expressing an enormous amount of aeromagnetic database in the form of flight paths and a method of extracting only data on a specific area required among aeromagnetic data or selectively removing only an undesired portion included in aeromagnetic data, so that, it is possible to remarkably reduce the consumption of time and effort due to users' inevitable manual work or the use of an interface difficult to be handled, as compared with the conventional art, thereby providing users with an efficient pre-processing operation of aeromagnetic data.

Airborne geophysical survey technology has been considerably developed owing to continuous the improvement of equipment performance with the development of electronic industries and various studies on data processing since survey methods were established after 1950s.

However, if the airborne geophysical survey technology is limited to only pre-processing, the technical development is mainly concentrated on leveling.

This results from the fact that although it is required to develop a plan for reducing complicated procedures substantially performed in most pre-processing techniques, the necessity of the development of pre-processing techniques is neglected because the most pre-processing techniques hardly have any room for new technical developments in fundamental technical viewpoint.

Currently commercialized geophysical data processing softwares support the pre-processing, and mostly take a method of providing and operating an integrated data base system and a general purpose data processing interface based on a single platform. Oasis Montaj™ produced by Geosoft Inc. in Australia may be exemplified as representative geophysical data processing software.

A data processing method based on a platform performs collective input/output of various geophysical survey data and data processing in connection with an integrated database, and thus it is possible to perform collective input/output, processing, and management of data regardless of survey methods.

However, if the conventional data processing method based on the platform is limited to aeromagnetic surveys requiring complicated pre-processing as compared with terrestrial surveys, this means that any optimized user interface for only the aeromagnetic surveys is not provided as a return service. As a result, the conventional data processing method may be referred to as an operating system which does not provide convenience to users aiming at a specific survey.

Therefore, the conventional art does not provide an optimum graphic user interface which considers unique characteristics of pre-processing of aeromagnetic data when the pre-processing is performed. As a result, most complicated procedures of the preprocessing should be performed by using an interface difficult to be handled or through manual work, and therefore, considerable time and effort are required.

SUMMARY

An aspect of the present invention is directed to an aeromagnetic pre-processing system based on a graphic user interface (GUI) and a pre-processing method using the same, which can provide a method of visualizing and expressing an enormous amount of aeromagnetic database (DB) in the form of flight paths and a method of extracting only data on a specific area required among aeromagnetic data or selectively removing only an undesired portion included in aeromagnetic data, so that, it is possible to remarkably reduce the consumption of time and effort due to users' inevitable manual work or the use of an interface difficult to be handled, as compared with the conventional art, thereby providing users with an efficient pre-processing operation of aeromagnetic data.

According to an embodiment of the present invention, there is provided an aeromagnetic pre-processing system based on a GUI, including: an input unit for inputting measured aeromagnetic data, GPS data, and reference magnetic data; a data storage unit for storing individual data, collection data, and edition data on division area data groups obtained after an investigation area is divided; a GUI providing unit for providing a GUI for data input/output; an operation unit for performing an operation to perform pre-processing for each of the division area data groups and collection and leveling of the division area data groups; and a controller for controlling the input unit, the data storage unit, the GUI providing unit, and the operation unit.

According to an embodiment of the present invention, there is provided a pre-processing method using an aeromagnetic pre-processing system based on a GUI, the pre-processing method including: a first process of reading, through an input unit, measured aeromagnetic data, GPS data, and reference magnetic data for each division data groups; a second process of synchronizing the input aeromagnetic data, GPS data, and reference magnetic data to have the same recording time; a third process of transforming GPS information represented with latitude and longitude to Transverse Mercator (TM) or Universe Transverse Mercator (UTM); a fourth process of performing correction of a delay corresponding to transceiver spacing and a heading effect corresponding to different flight directions; a fifth process of constituting an integrated DB by collecting all division data groups stored in a division data group DB of a data storage unit; a sixth process of removing unnecessary data beyond an investigation area; a seventh process of selectively removing unnecessary data within the investigation area; an eighth process of performing specification and edition of an address for each survey of the integrated DB; a ninth process of performing conventional leveling; and a tenth process of performing micro leveling.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION

Figure 1:
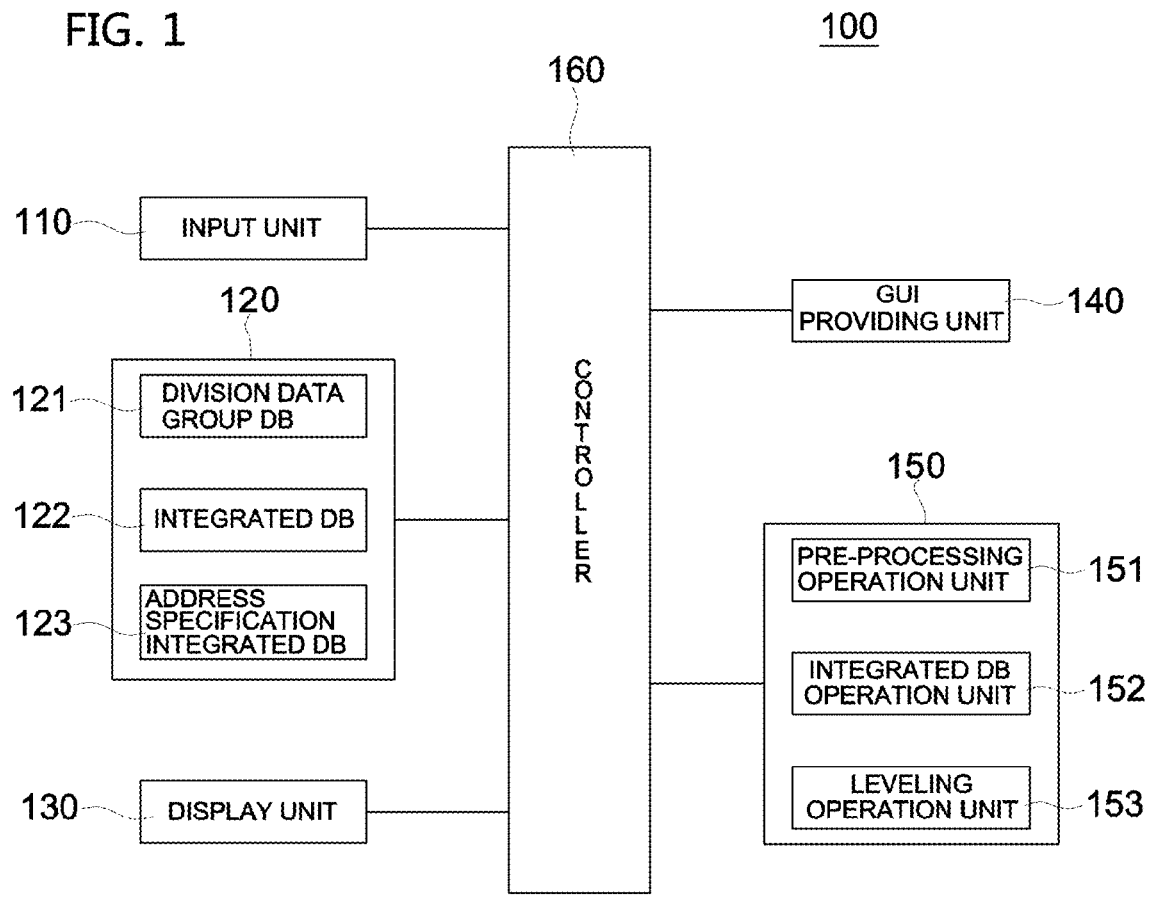
FIG. 1 illustrates a configuration of an aeromagnetic pre-processing system based on a graphic user interface (GUI) according to an embodiment of the present invention.

Exemplary embodiments of the present invention will be described below in detail with reference to the accompanying drawings. Wherever possible, the same reference numerals will be used to refer to the same elements throughout the specification, and a duplicated description thereof will be omitted. It will be understood that although the terms "first", "second", etc. are used herein to describe various elements, these elements should not be limited by these terms. These terms are only used to distinguish one element from another element.

Hereinafter, exemplary embodiments of the present invention will be described in detail with the accompanying drawings.

FIG. 1 illustrates a configuration of an aeromagnetic pre-processing system based on a graphic user interface (GUI) according to an embodiment of the present invention.

Referring to FIG. 1, the aeromagnetic pre-processing system 100 according to the embodiment of the present invention includes an input unit 110, a data storage unit 120, a display unit 130, a GUI providing unit 140, an operation unit 150, and a controller 160.

The input unit 110 receives, as inputs, aeromagnetic data, GPS data, and reference magnetic data under control of the controller 160.

The data storage unit 120 includes a division data group database (DB) 121, an integrated DB 122, and an address specification integrated DB 123.

The division data group DB 121 acquires division areas by dividing an investigation area due to a limitation of flight time and then individually stores data groups of the acquired division areas under control of the controller 160.

The integrated DB 122 collects and stores the division areas stored in the division data group DB 121.

The address specification integrated DB 123 removes survey data beyond the investigation area and unnecessary data corresponding to an overlapping or irregular flight within the investigation area, provides an address to every survey, and then stores the surveys.

The display unit 130 visually displays, on a screen, data to be processed and/or data having been processed.

The GUI providing unit 140 provides a GUI for data input/output. That is, the GUI providing unit 140 includes GUIs for supporting synchronization of data, GPS coordinate transformation, correction of delay and heading effect, removal of various unnecessary data at the outside or inside of an investigation area, and visualization and leveling of the address specification integrated DB, and provides a corresponding GUI when a required command is performed.

The operation unit 150 includes a pre-processing operation unit 151, an integrated DB operation unit 152, and a leveling operation unit 153.

The pre-processing operation unit 151 performs a pre-processing operation to process information read through the input unit 110.

The integrated DB operation unit 152 performs an operation to generate an integrated DB by collecting division data groups.

The leveling operation unit 152 performs an operation to implement conventional leveling and micro leveling.

The controller 160 controls the input unit 110, the data storage unit 120, the display unit 130, the GUI providing unit 140, and the operation unit 150 according to a predetermined control signal.

That is, the controller 160 displays various information input through the input unit 110 on the display unit by using a corresponding GUI of the GUI providing unit 140 according to a control command, if the input of information is completed, provides the operation unit 150 with storage information of the data storage unit 120 according to input information, displays information processed in the operation unit 150 on the display unit 130, and sorts the information to be stored in the corresponding DBs 121 to 123 of the data storage unit 120.

Figure 2:
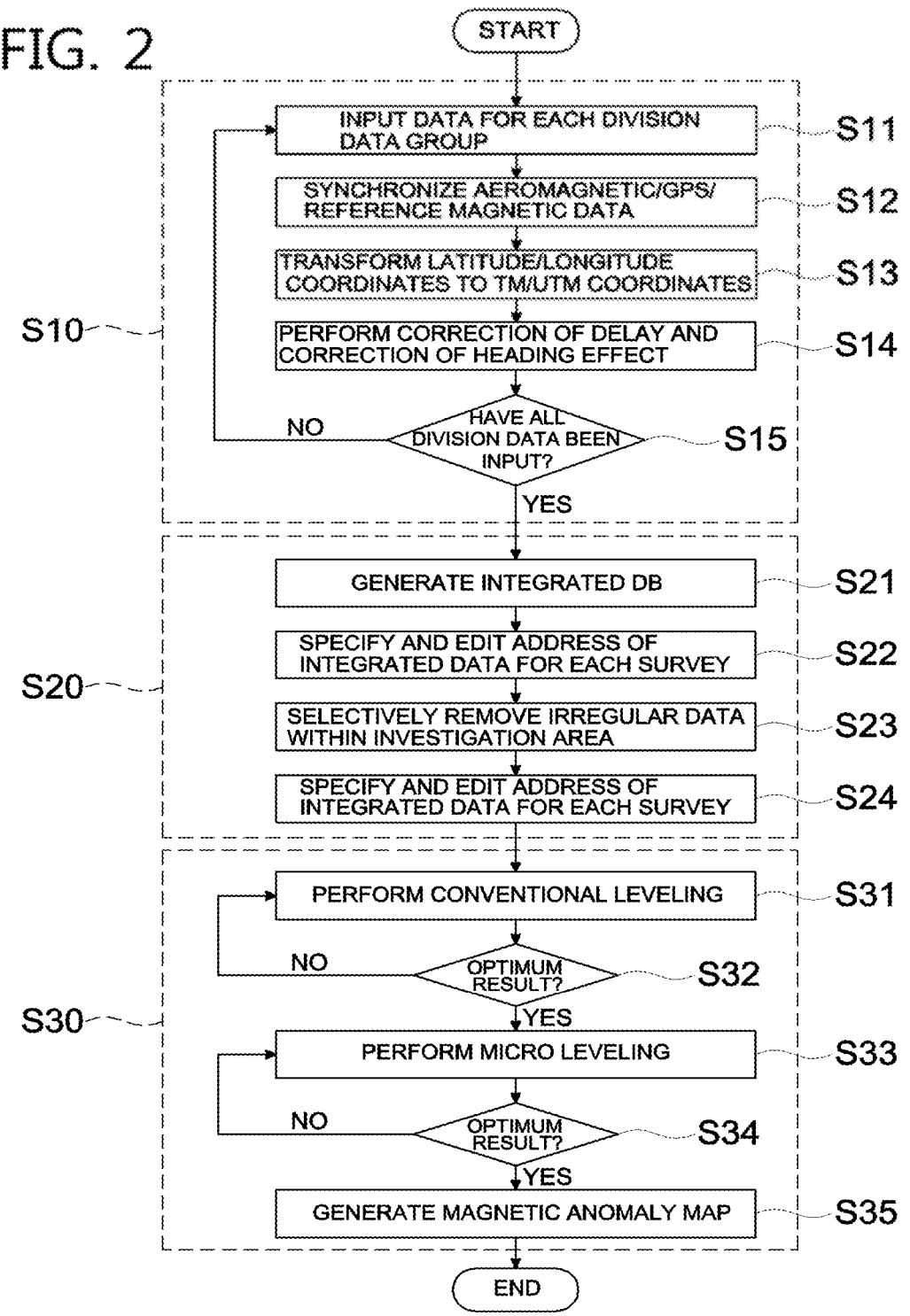
FIG. 2 is a flowchart illustrating a process from inputting of aeromagnetic data to deriving of a magnetic anomaly as a final result of pre-processing according to an embodiment of the present invention.

FIG. 2 is a flowchart illustrating a process from inputting of aeromagnetic data to deriving of a magnetic anomaly as a final result of pre-processing according to an embodiment of the present invention.

Referring to FIG. 2, the process according to the embodiment of the present invention includes a first step (S10) of performing data input, a second step (S20) of performing data processing, and a third step (S30) of performing various leveling.

Hereinafter, processes of the first to third steps (S10 to S30) will be sequentially described with reference to FIGS. 1 to 5.

First, first to fifth processes (S11 to S15) constituting the first step (S10) will be described in detail.

In the first process (S11), all measured data (i.e., aeromagnetic data, GPS data, and reference magnetic data) are read for each division data group through the input unit 110.

Next, in the second process (S12), the input aeromagnetic data, GPS data, and reference magnetic data are synchronized to having the same recording time.

Next, in the third process (S13), the GPS information represented with latitude and longitude is transformed to Transverse Mercator (TM) or Universe Transverse Mercator (UTM).

Next, in the fourth process (S14), correction of a delay effect corresponding to transceiver spacing and a heading effect corresponding to different flight directions is performed. In this case, the corrected result is stored in the division data group DB 121 of the data storage unit 120.

Figure 3A:
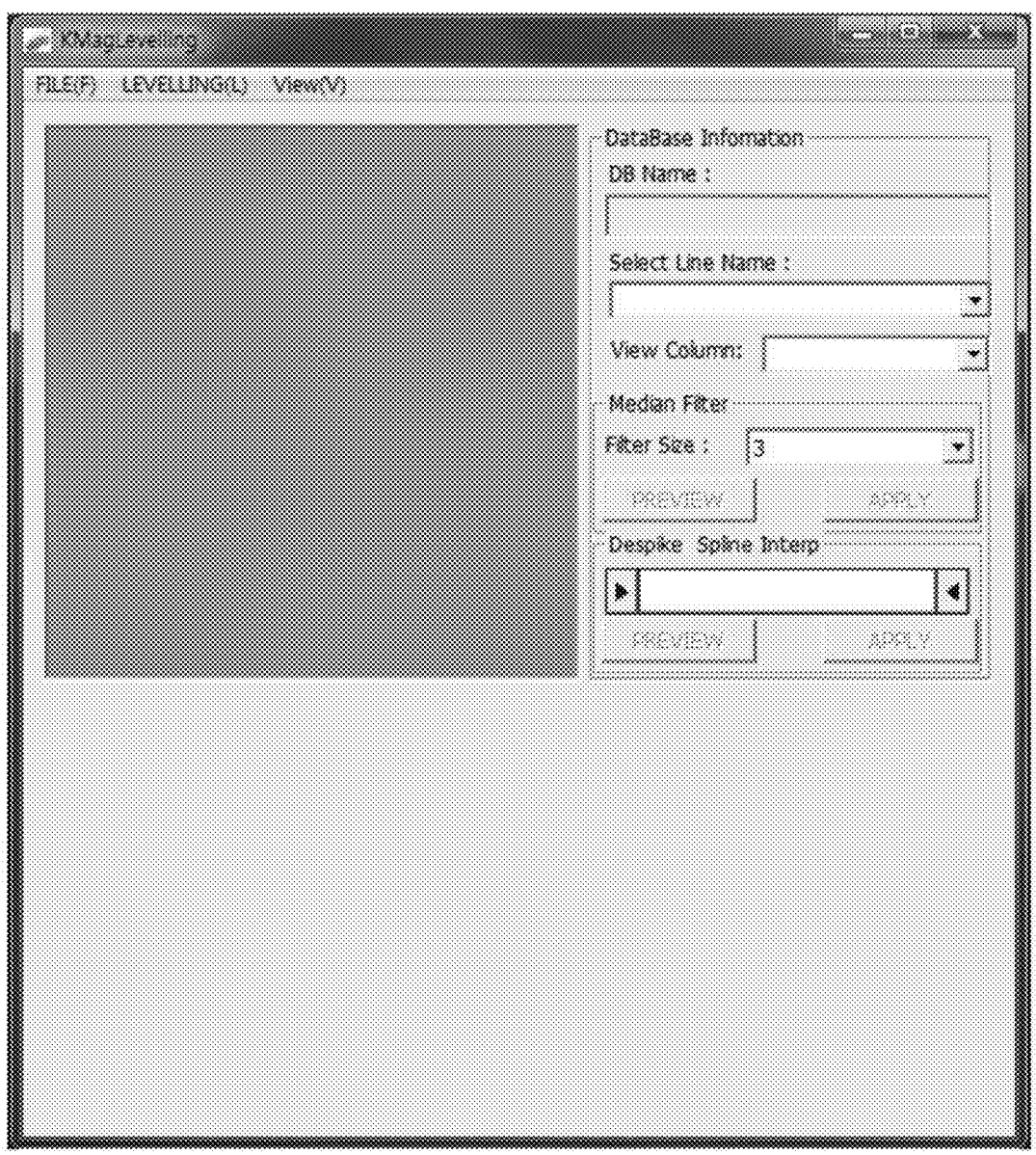
FIG. 3A illustrates a GUI representing the aeromagnetic pre-processing system of the present invention.
Figure 3B:
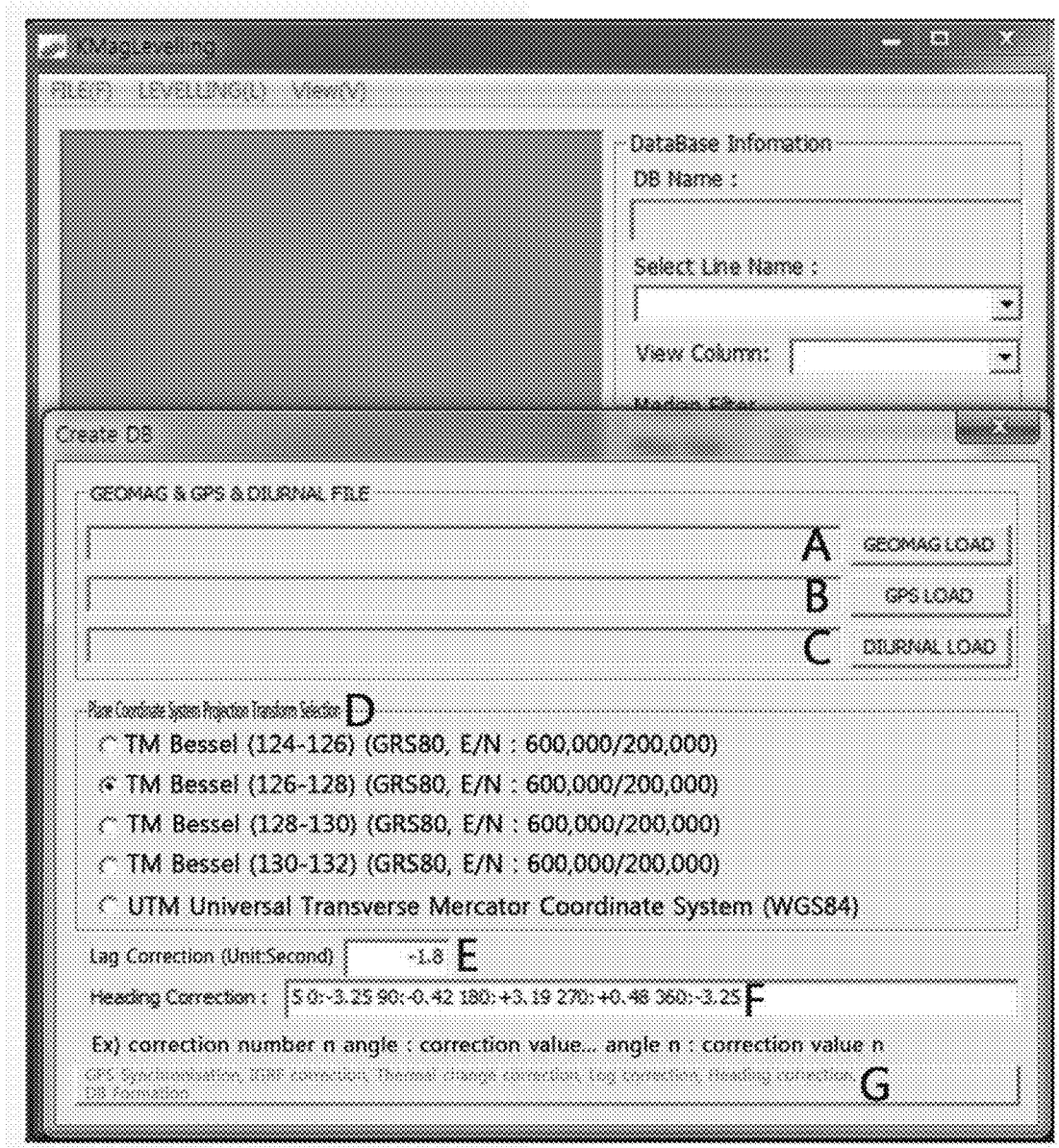
FIG. 3B illustrates, together with the GUI, an interface pop-up window for receiving, as inputs, aeromagnetic field data, GPS data, and reference magnetic data, and collectively performing synchronization between the data, coordinate transformation of the GPS data, and correction of delay time and heading effect.

An example in which the first to fourth processes (S11 to S14) are performed is illustrated in FIG. 3. As shown in FIG. 3B, aeromagnetic field data (see symbol A), GPS data (see symbol B), and reference magnetic data (see symbol C) are received as inputs to collectively perform synchronization between the data (see symbol D), coordinate transformation of the GPS data, correction of delay time (see symbol E), and correction of heading effect (see symbol F), and the corrected result is stored in the division data group DB 121 of the data storage unit 120.

Finally, in the fifth process, it is determined whether all division data have been input. When it is not determined that all division data have been input in the fifth process (S15) (No), the first step (S10) returns to the first process (S11). However, when it is determined that all division data have been input in the fifth process (S15) (Yes), the first step (S10) proceeds to the second step (S20).

Figure 4A:
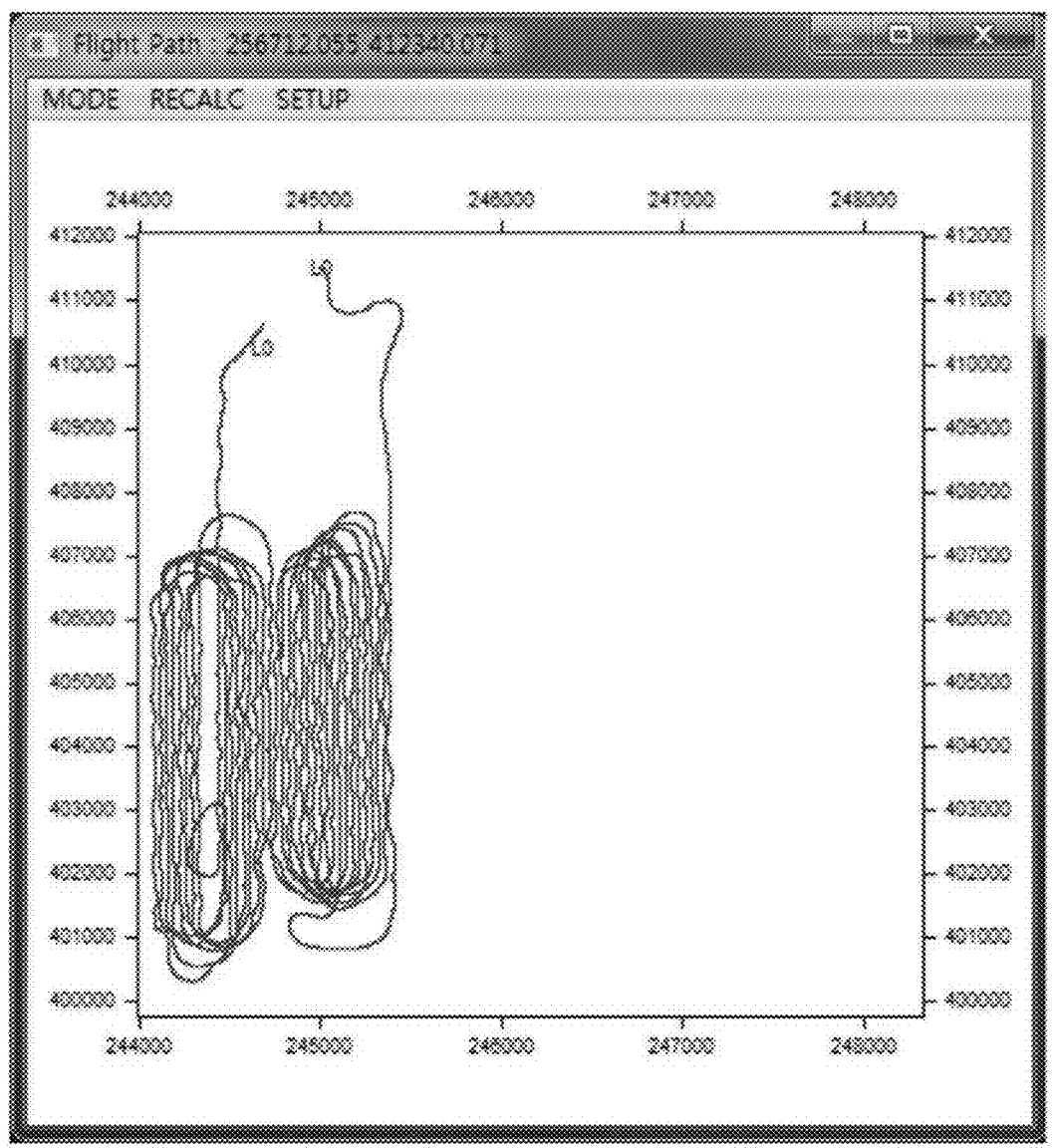
FIG. 4A, FIG. 4B, FIG. 5A, and FIG. 5B respectively illustrates four division data groups in a visualized form when aeromagnetic data is acquired by dividing an investigation area into the four data groups due to a limitation of aircraft flight time.
Figure 4B:
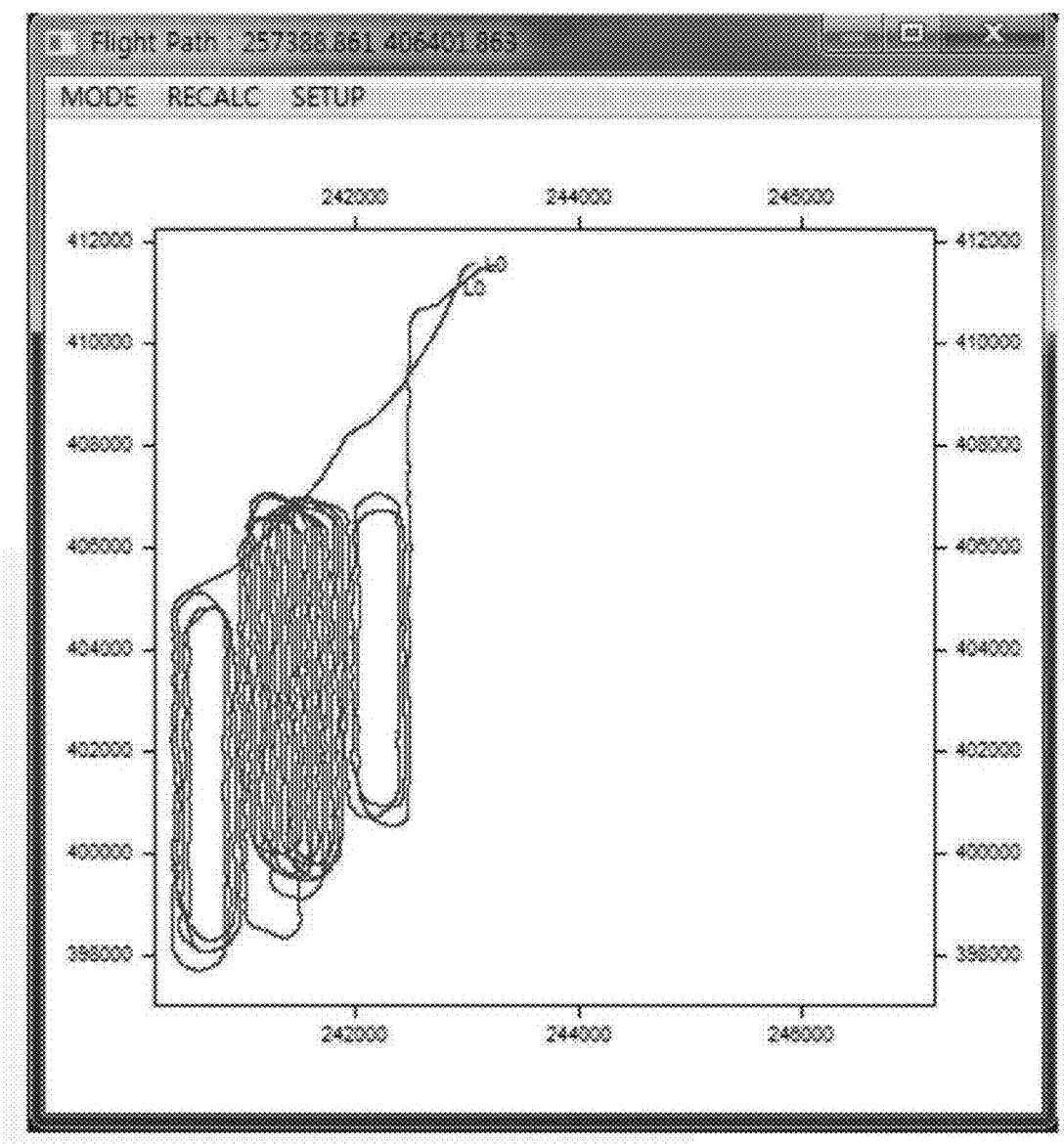
Figure 5A:
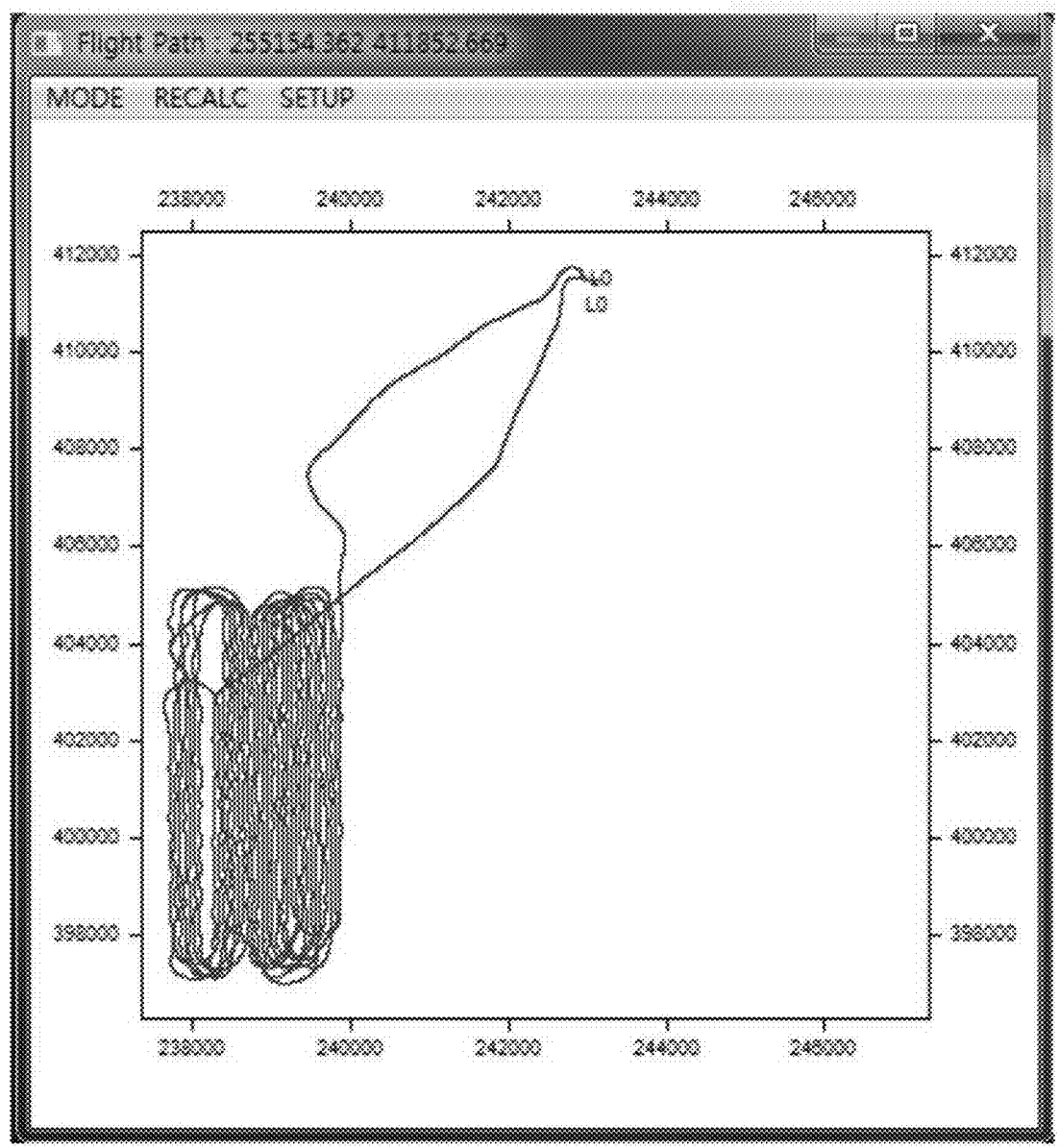
Figure 5B:
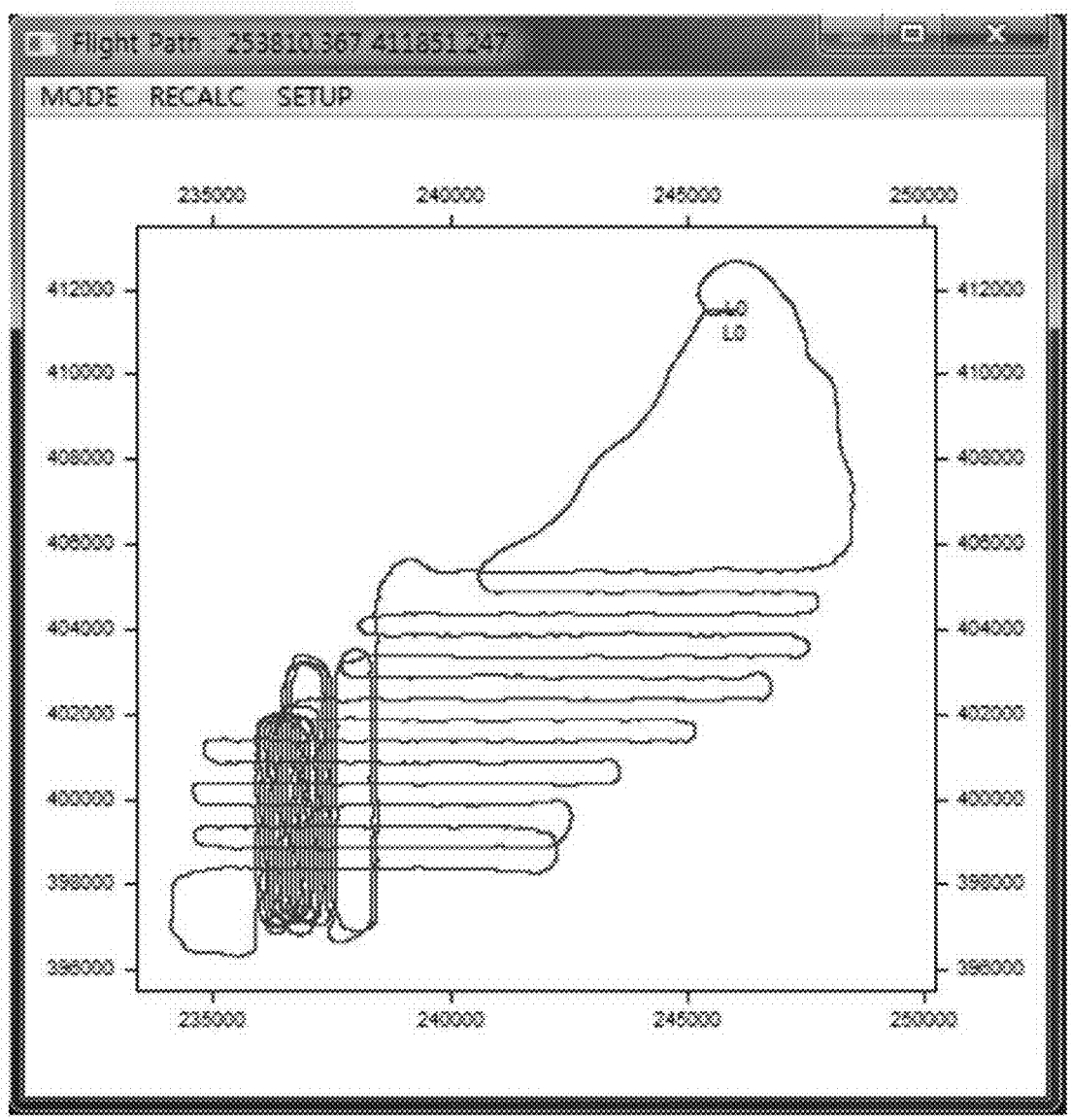

Meanwhile, FIG. 4 and FIG. 5 respectively illustrates four division data groups in a visualized form when aeromagnetic data is acquired by dividing an investigation area into the four data groups due to a limitation of aircraft flight time. The four division data groups may be used as an embodiment of the fifth process (S15).

Second, first to fourth processes (S21 to S24) constituting the second step (S20) will be described in detail.

First, in the first process (S21), all division data groups stored in the division data group DB 121 of the data storage unit 120 are collected, thereby constituting an integrated DB. In this case, an operation for constituting the integrated DB is performed in the integrated DB operation unit 152 of the operation unit 150.

Next, in the second process (S22), unnecessary data beyond the investigation area is removed.

Here, the reason why the unnecessary data beyond the investigation area is generated is that as an aircraft under investigation does not suddenly changes its flight path in an area beyond the investigation area, measurement data of the area beyond the investigation area is inevitably included.

Meanwhile, all aeromagnetic data stored in the integrated DB 122 are preferably visualized as flight paths by the GUI providing unit 140, thereby providing more convenience to users.

Hereinafter, the second process (S22) will be described in detail with reference to FIG. 6.

Figure 6A:
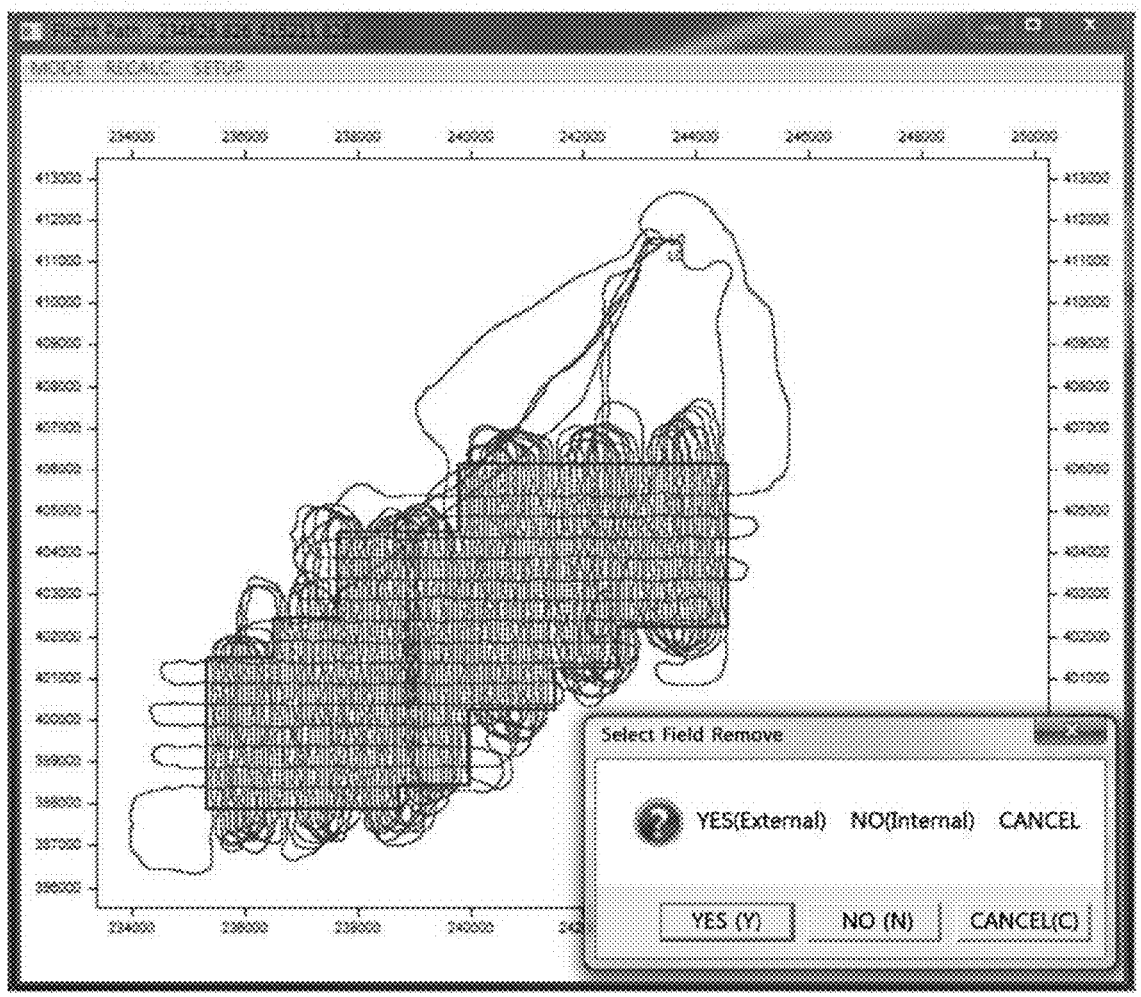
FIG. 6A illustrates division data groups visualized in the form of flight paths by collecting the division data groups and constituting the collected division data groups as an integrated DB.
Figure 6B:
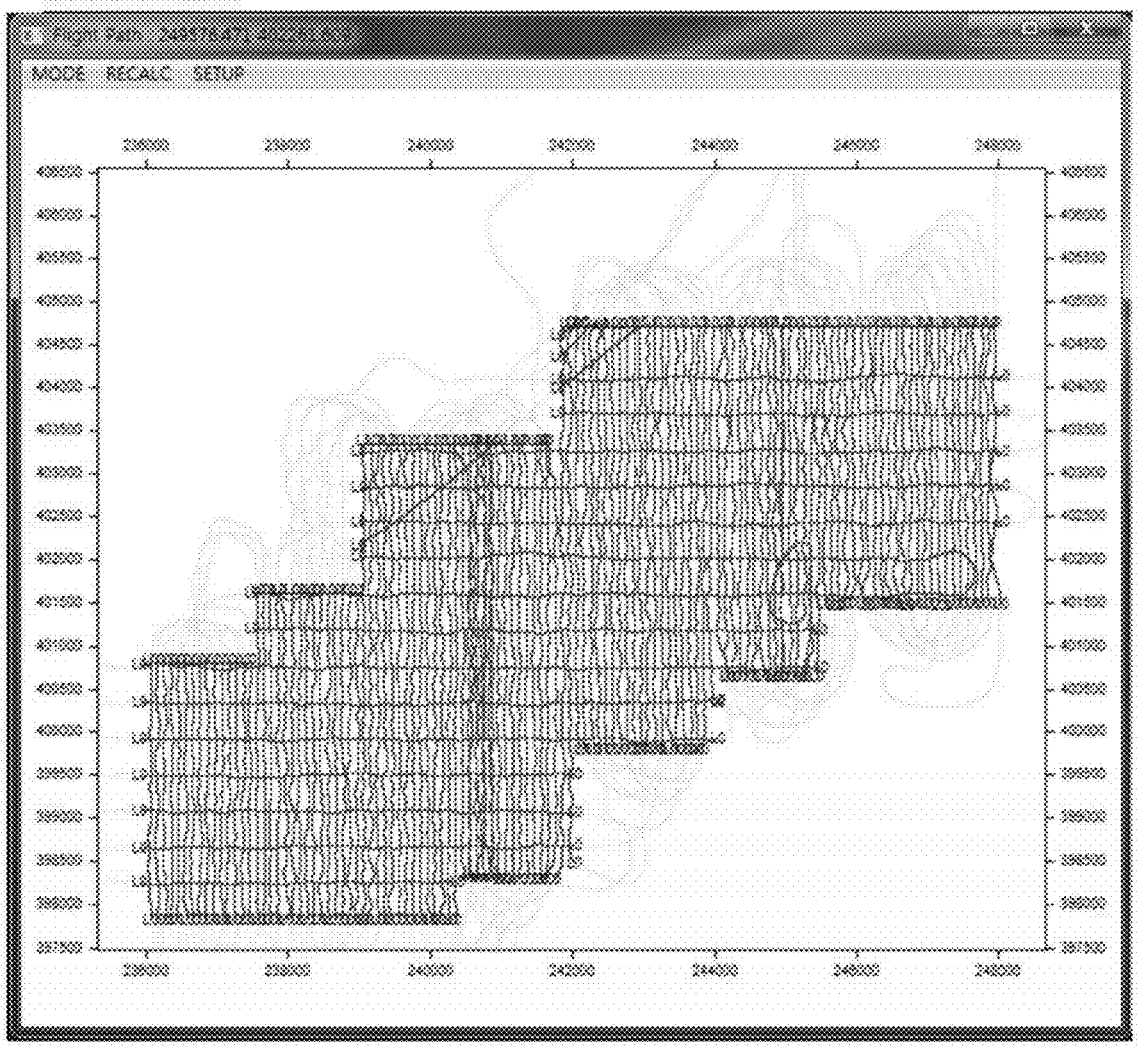
FIG. 6B illustrates a user interface for removing data beyond an investigation area represented as a solid-line polygon and a processing result.

FIG. 6A illustrates division data groups visualized in the form of flight paths by collecting the division data groups and constituting the collected division data groups as an integrated DB, and FIG. 6B illustrates a user interface for removing data beyond an investigation area represented as a solid-line polygon and a processing result.

The integrated DB 122 includes data on all flight paths until the aircraft takes off, flies an investigation area, and then lands. The data includes even data of unnecessary flight areas beyond a previously selected investigation area, and therefore, a pre-processing technique for effectively removing the data of the unnecessary flight areas is required.

Accordingly, in the present invention, in order to selectively extract data on only an investigation area, the investigation area is configured as a combination of polygonal coordinates in a looped curve shape, and a user interface for removing unnecessary data beyond the investigation area is supported by using the configured combination.

That is, as shown in FIG. 6, there is shown a user interface in which an investigation area is specified with a looped curve of a black solid line in the integrated DB 122 represented as flight paths, and only data within the investigation area is extracted.

Here, the investigation area has a closed polygonal shape, and coordinates of polygon vertices having a finite number are created as a file, to be simply read and applied. Thus, a user can easily perform processing. In this case, a result obtained after the processing is shown in FIG. 6B.

Next, in the third process (S23), irregular data within the investigation area is selectively removed.

Here, the irregular data refers overlappingly measured data or data having irregular flight paths. When the data to be removed is a portion of a selected survey, the present invention supports a GUI in which a survey segment and a segment survey are selectively extracted and removed by using a mouse supported by the GUI providing unit 140.

Hereinafter, an example in which the third process S23 is performed will be described in detail with reference to FIGS. 7 and 8.

Figure 7A:
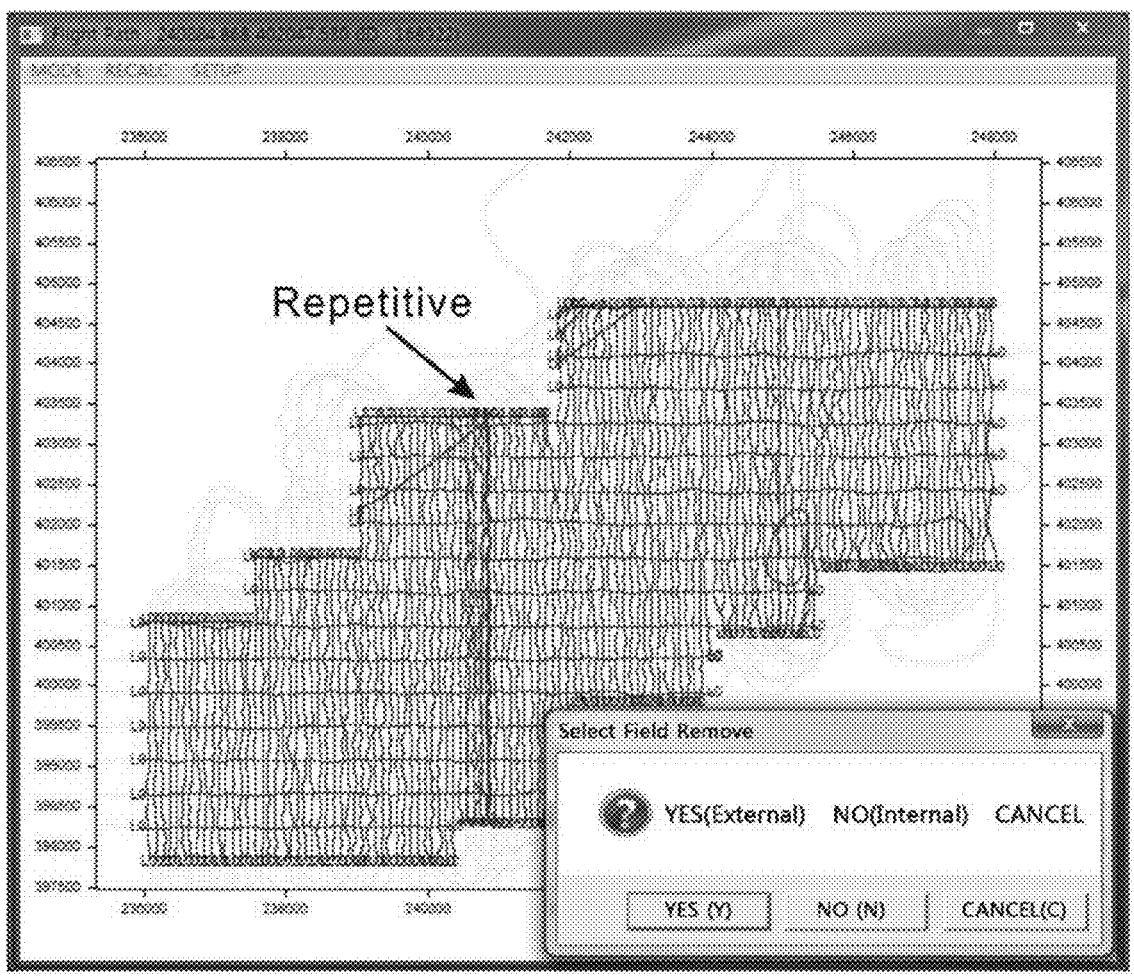
FIG. 7A illustrates an overlapping state of a survey, which frequently occurs when division data groups are collected.
Figure 7B:
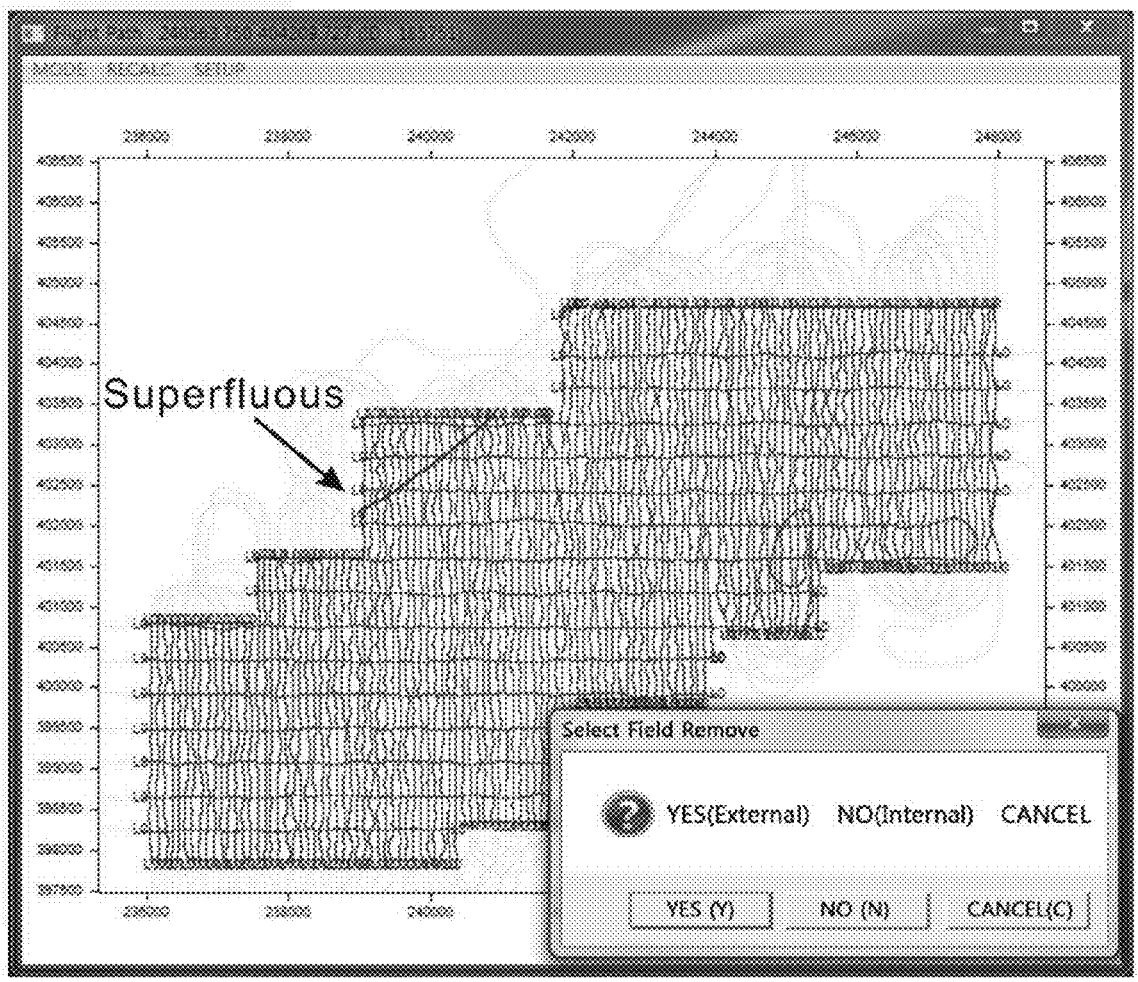
FIG. 7B illustrates a user interface in which an unnecessary flight record in selectively removed by using a mouse.

FIG. 7A illustrates an overlapping state of a survey, which frequently occurs when division data groups are collected, and FIG. 7B illustrates a user interface in which an unnecessary flight record in selectively removed by using a mouse.

Unnecessary data to be removed also exists in data within an investigation area. That is, in a process of acquiring by dividing the investigation area, there frequently occurs a case where a surface is overlappingly measured as shown in FIG. 7A or a case where the aircraft inevitably traverses the investigation area for the next survey flight as shown in FIG. 7B.

In this case, a pre-processing process of selectively specifying and removing unnecessary data is required. To this end, the present invention supports a user interface in which a corresponding survey can be specified by using the mouse and selectively removed.

Although data is acquired along a predetermined flight path, there frequently occurs a case where data is inevitably acquired along an irregular flight path due to a certain reason. In this case, a user interface which is delicate and can consider user's convenience is required.

Figure 8A:
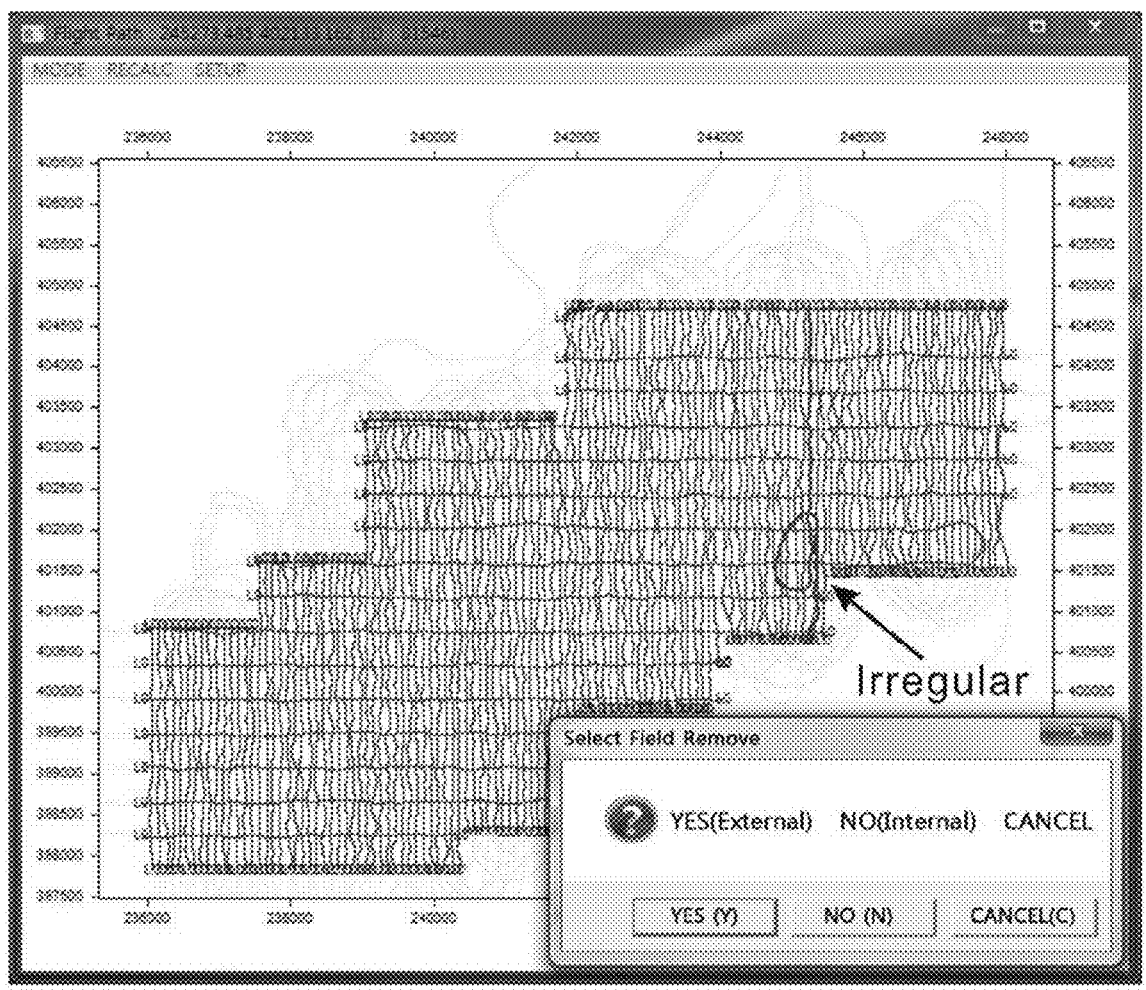
FIG. 8A illustrates a user interface which supports selective removal of only an irregular portion when survey data of an irregular flight path exists within an investigation area.
Figure 8B:
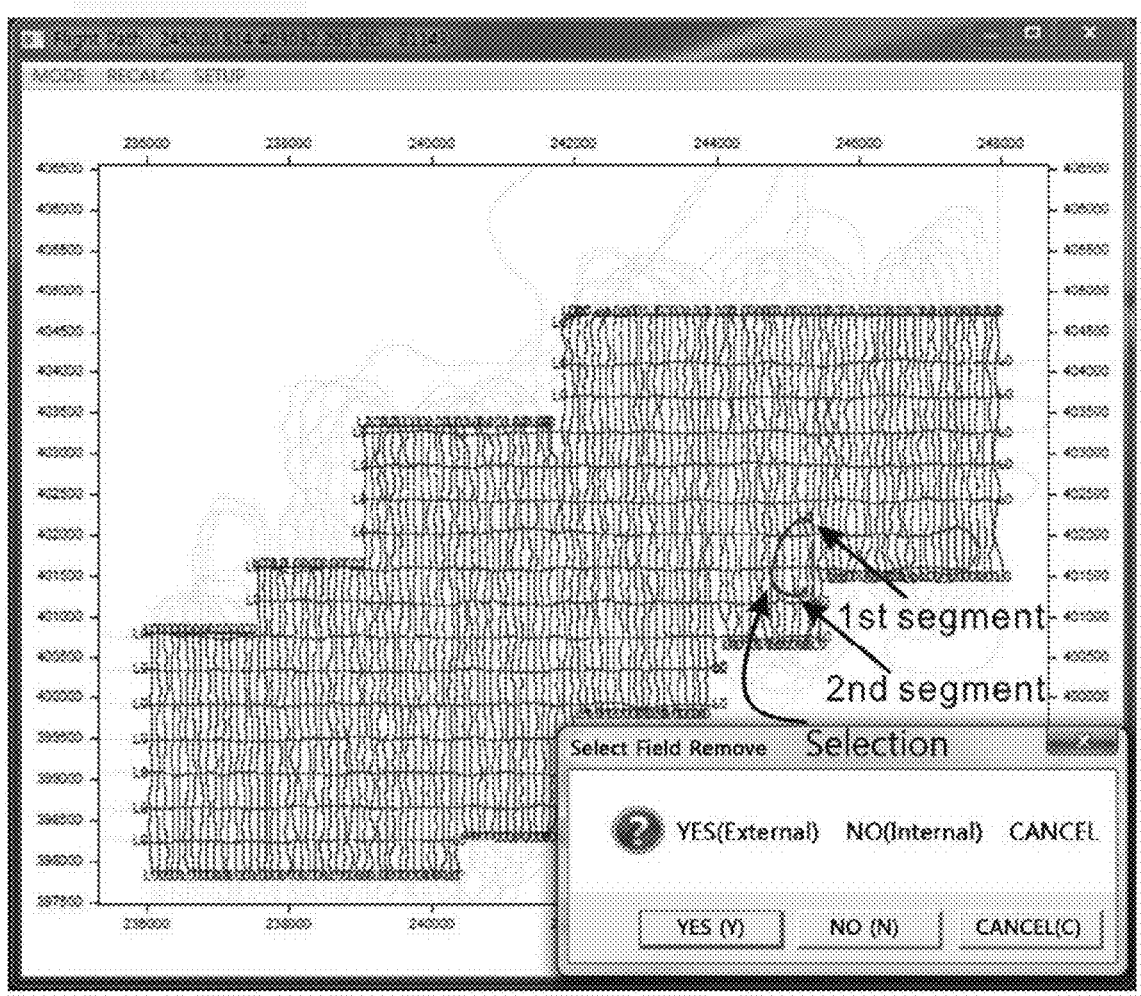
FIG. 8B illustrates a user interface in which two points are selected as segment points from the entire survey by using a mouse in the entire survey of FIG. 8A, separated into three segmented survey groups, and then selects and remove a middle segment survey representing the irregular flight path.

FIG. 8A illustrates a user interface which supports selective removal of only an irregular portion when survey data of an irregular flight path exists within an investigation area, and FIG. 8B illustrates a user interface in which two points are selected as segment points from the entire survey by using a mouse in the entire survey of FIG. 8A, separated into three segmented survey groups, and then selects and remove a middle segment survey representing the irregular flight path.

As shown in FIG. 8A, a selected survey line in the south/north direction is in a state in which data is acquired along an irregular flight path due to a certain reason, and data acquired along a circular flight path of a lower survey in the south direction is required to be selectively removed for the purpose of smooth data processing from now on.

To this end, the present invention has introduced a technique of segmenting a survey. First, the entire of a corresponding survey is selected as shown in FIG. 8A, and a segment point is generated by clicking the right side of the mouse.

In this case, as shown in FIG. 8B, two segment points are selected, and the entire survey is segmented into two segment points. Therefore, the entire survey is separated into a total of three segment surveys. Thus, an irregular survey to be removed is one of the three segment surveys, and corresponds to a circular irregular survey. Accordingly, the irregular survey can be selectively removed by simply clicking the mouse.

Finally, in the fourth process (S24), an address of the integrated DB for each survey is specified and edited.

Hereinafter, an example in which the fourth process (S24) is performed will be described in detail with reference to FIGS. 9 to 112.

Figure 9A:
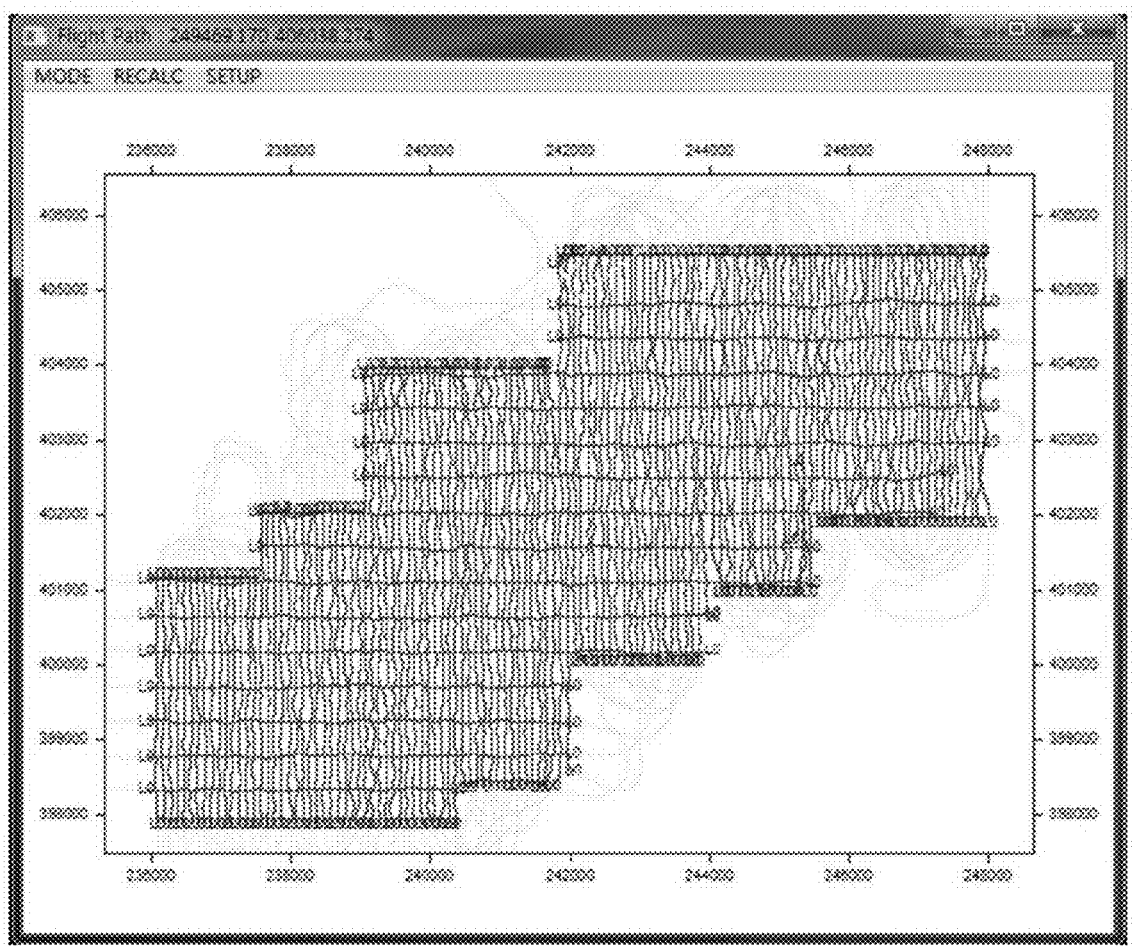
FIG. 9A illustrates a user interface showing a process of constituting an address specification integrated DB from aeromagnetic data after pre-processing.
Figure 9B:
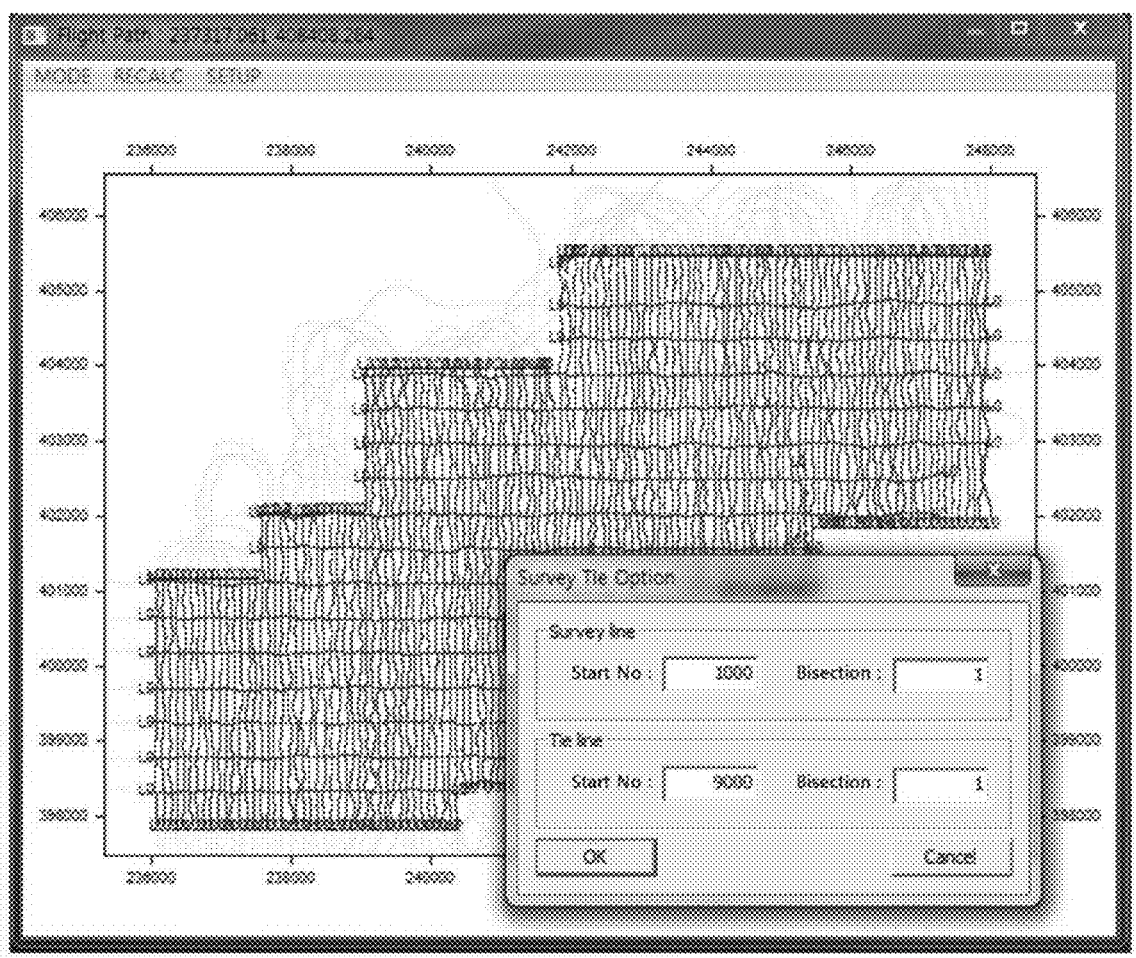
FIG. 9B illustrates a user interface in which an address is specified for each survey.
Figure 10A:
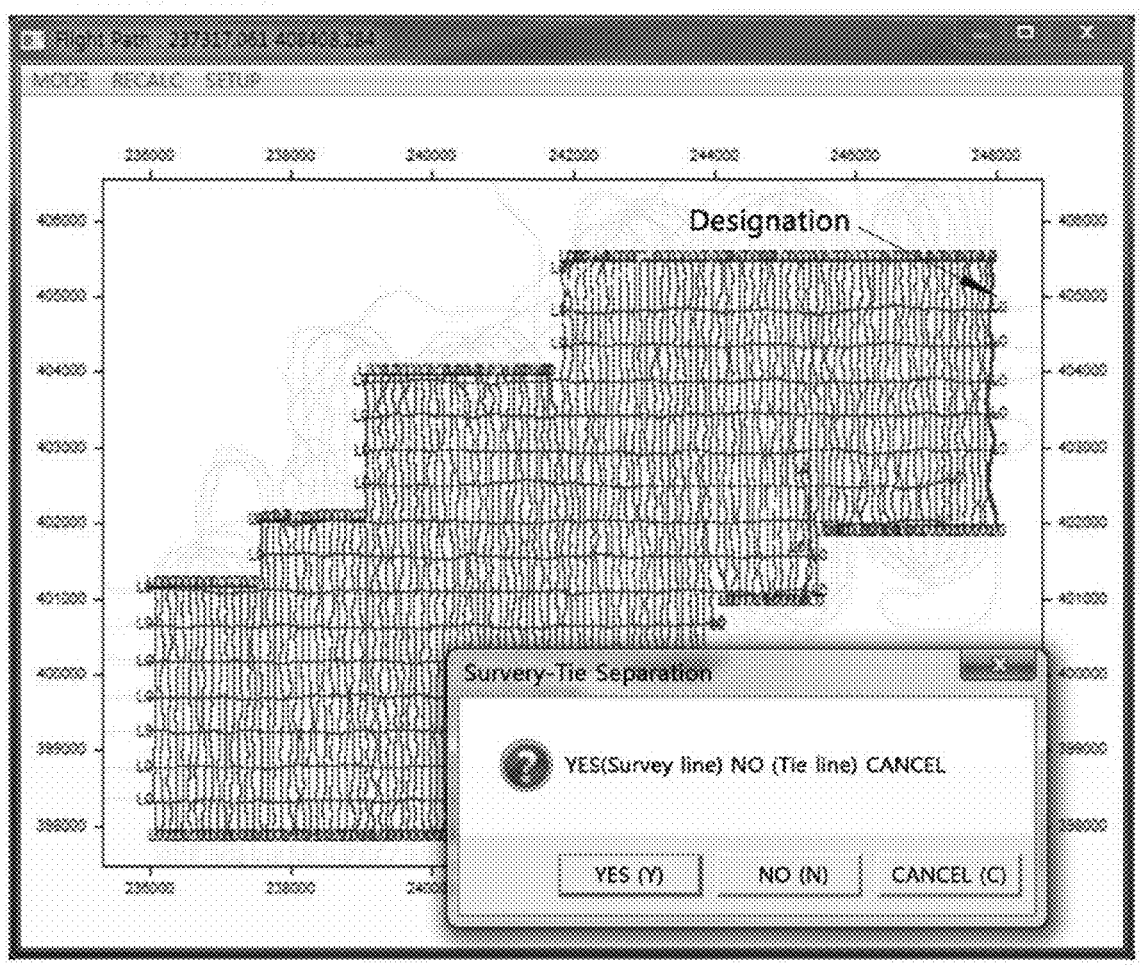
FIG. 10A illustrates a user interface in which a survey is separated and specified into a survey line and a tie line.
Figure 10B:
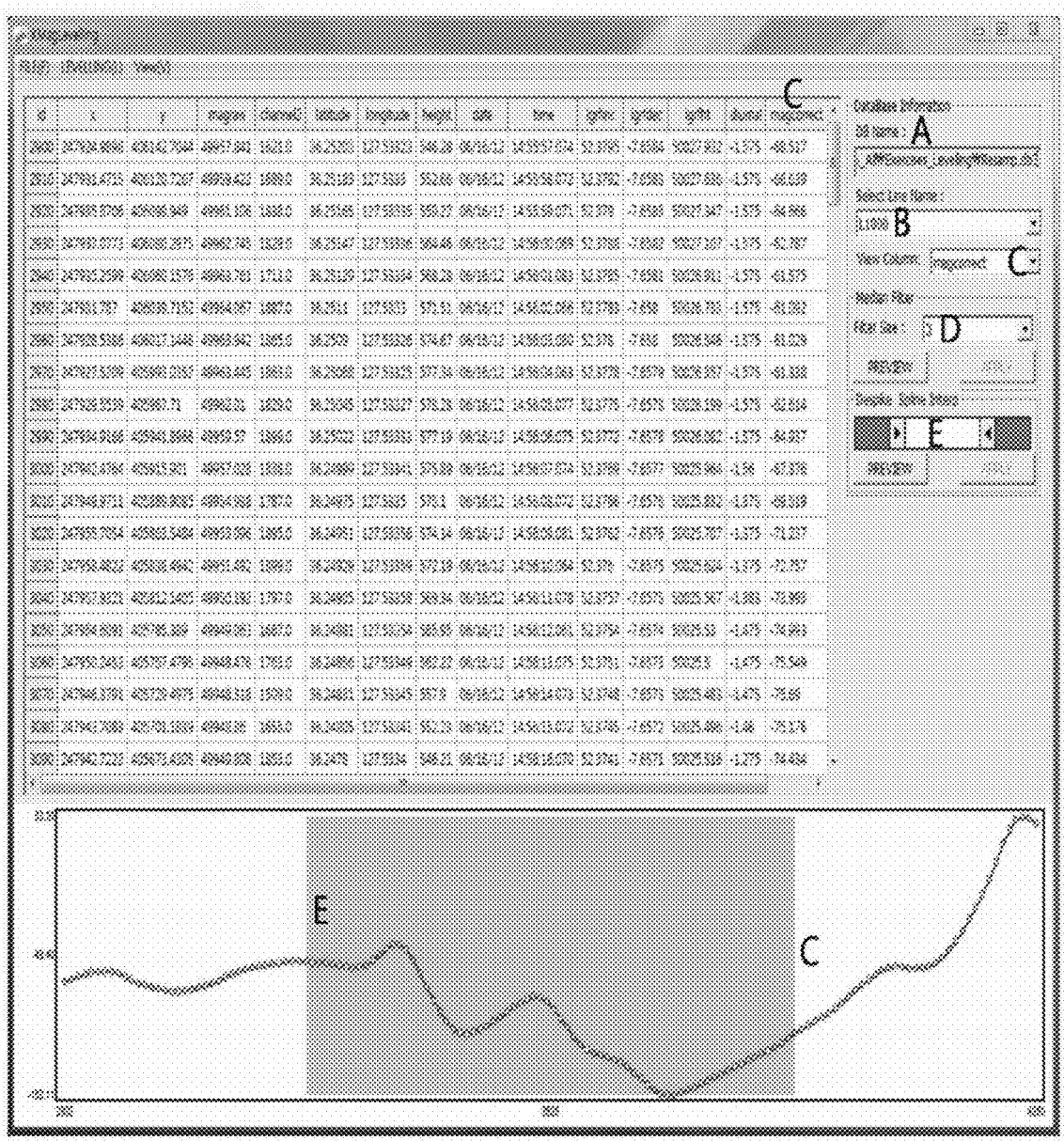
FIG. 10B illustrates a user interface with respect to the address specification integrated DB as a final result.

FIG. 9A illustrates a user interface showing a process of constituting an address specification integrated DB from aeromagnetic data after pre-processing, FIG. 9B illustrates a user interface in which an address is specified for each survey, FIG. 10A illustrates a user interface in which a survey is separated and specified into a survey line and a tie line, and FIG. 10B illustrates a user interface with respect to the address specification integrated DB as a final result.

Referring to FIG. 9A, if a process of removing all data which are unnecessary or may have bad influence at the inside/outside of an investigation area is ended, a process of generating an address specification integrated DB for specifying an address for each survey is started. This is because the approach and access to arbitrary data of the integrated DB is required for the purpose of edition and leveling to be performed from now on.

To this end, a process of dividing data constituting the integrated DB according to a survey line and a tie line is first required. Therefore, addresses are also to be divided and specified.

To this end, the present invention, as shown in FIG. 9B, supports an input window capable of specifying an address for each survey by dividing the survey into the survey line and the tie line. As shown in FIG. 10A, the present invention provides a user interface in a manner that one survey in the south/north or east/west direction is arbitrarily specified, and separated into surveys by asking whether the one survey is the survey line or the tie line, and an unique address is specified with respect to each of the separated surveys.

As shown in FIG. 10A, since data was acquired with the survey line in the south/north direction at the beginning, if 'Yes' is clicked on a query window at the right lower end, the south/north direction is recognized as the survey line, and the east/west direction is recognized as the tie line. An address for each survey is automatically specified to each of the survey line and the tie line in the address specification manner shown in FIG. 9B. If the specification of all addresses is ended, a final result is upgraded to the address specification integrated DB 123.

If the above-described process is completed, as shown in FIG. 10B, the aeromagnetic pre-processing system according to the embodiment of the present invention loads the address specification integrated DB 123, and allows all data corresponding to the respective survey addresses (right symbol B) to be interlocked in the form of a data table (upper end symbol B). Simultaneously, all the data are visualized in a graphic form on window E, thereby waiting a next command.

The interlocking manner is provided to effectively remove an editing function capable of selectively removing data contaminated by noise included in aeromagnetic data under a user's decision, and an example of the interlocking manner is illustrated in FIG. 11.

Figure 11A:
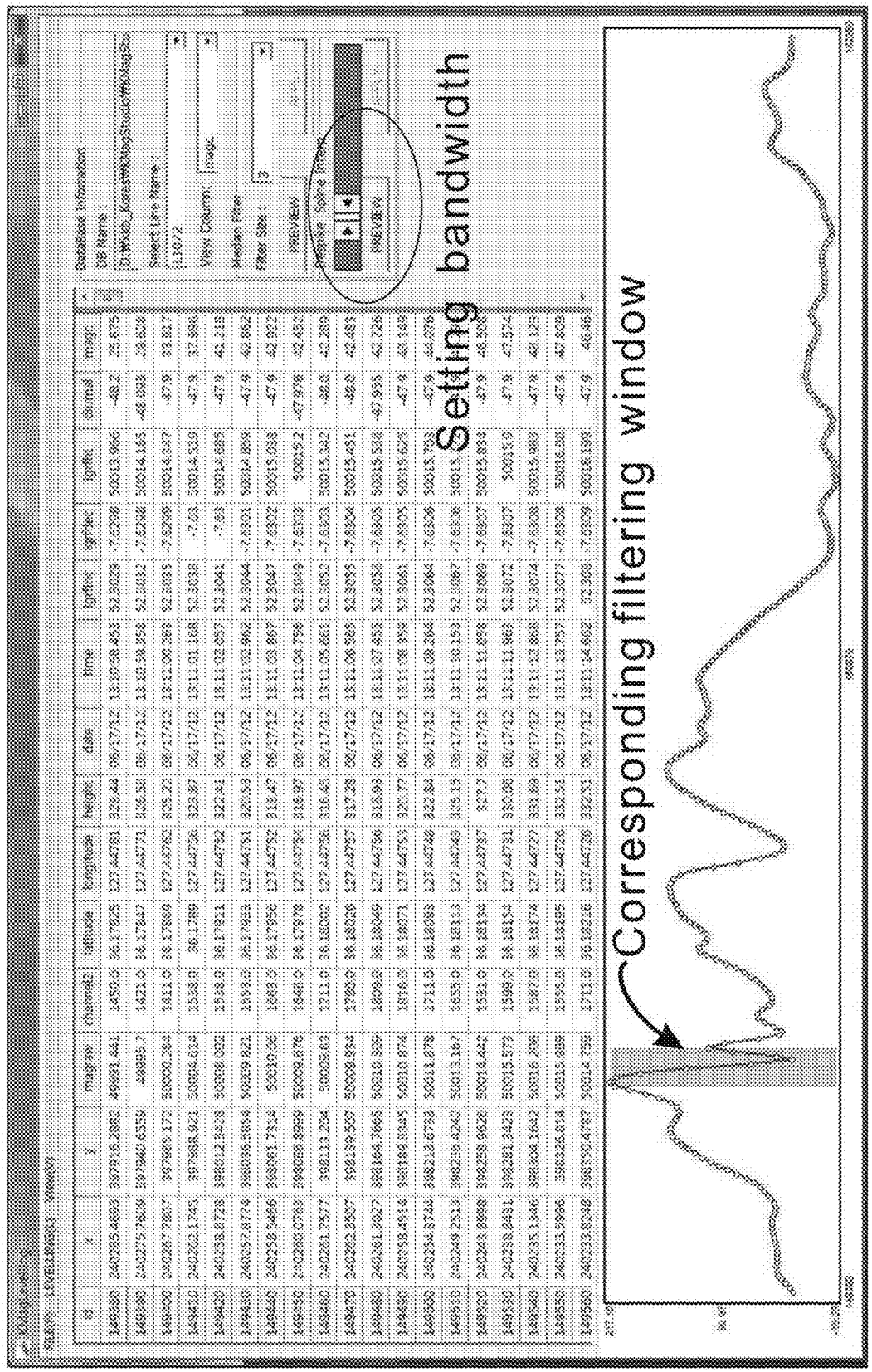
FIG. 11A illustrates a user interface in which data is edited by selecting an appropriated filtering window with specific survey data, and FIG. 11B illustrate an example of a process of waiting a user's decision by overlappingly visualizing results before/after the application of FIG. 11A.
Figure 11B:
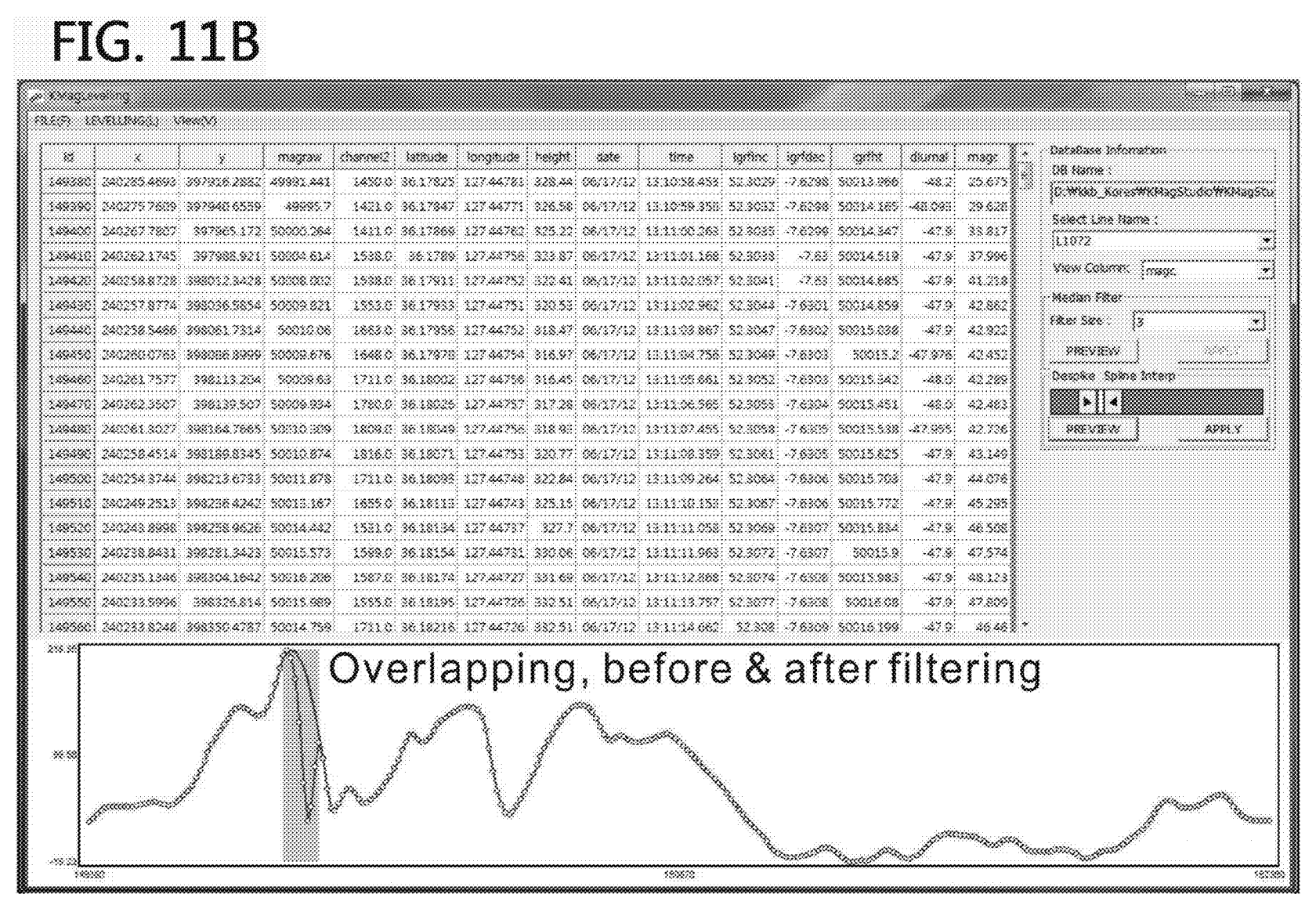

FIG. 11A illustrates a user interface in which data is edited by selecting an appropriated filtering window with specific survey data, and FIG. 11B illustrate an example of a process of waiting a user's decision by overlappingly visualizing results before/after the application of FIG. 11A.

Referring to FIG. 11, a solid line circle shown on a right menu refers to a window specifying a window size for applying median filtering that is effective in removing random noise by using a filtering method of replacing a value of a point with a median within the window using the value as the center. The window size is supported to be adjusted by dragging the mouse. Simultaneously the window size is expressed as cyan on the window E shown in a graphic form.

Meanwhile, a process of setting a window so as to removing a section determined that noise is included due to a sudden spatial change in magnetic data by using the median filtering is illustrated as an embodiment (FIG. 11A), and a state in which a user's decision is waited by overlappingly visualizing results before/after the application of the median filtering is illustrated as an embodiment (FIG. 11B).

That a user interface is provided in the visualized form as described above is provided for the purpose of promoting user's convenience so as to easily decide when the user derives a final result through repetitive trials and errors because the leveling for removing noise is an experiential data processing process.

If the process of editing all the data is ended, the third step (S30) of performing leveling is performed as a final pre-processing step of aeromagnetic data.

Figure 12:
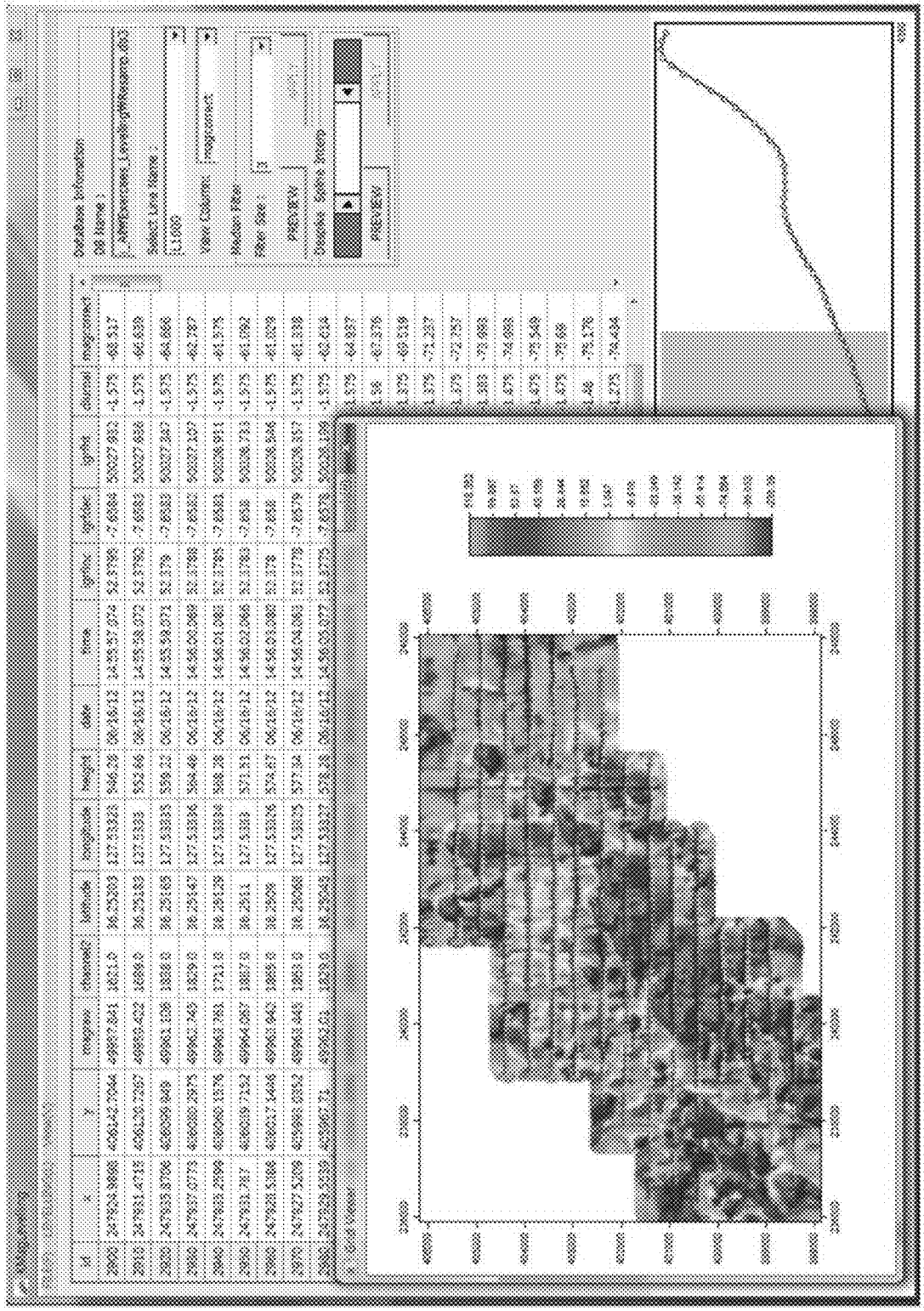
FIG. 12 illustrates raw aeromagnetic data after a pre-processing process, which is visualized with a magnetic anomaly.

FIG. 12 illustrates raw aeromagnetic data after a pre-processing process, which is visualized with a magnetic anomaly.

Referring to FIG. 12, an uncorrected error can be identified for each of the survey line and the tie line, which still remain even after the second step (S20), is performed. The uncorrected error is corrected through the following leveling.

Third, first to fifth processes (S31 to S35) constituting the third step (S30) will be described in detail.

First, in the first process (S31), conventional leveling is performed.

Next, in the second process (S32), it is determined whether the user has derived an optimum result as the result obtained by performing the first process (S31).

If it is not determined that the user has derived the optimum result in the second process (S32) (No), the third step (S30) returns to the first process (S31). If it is determined that the user has derived the optimum result in the second process (S32) (Yes), the third step (S30) proceeds to the third process (S33) of performing micro leveling.

Hereinafter, an example in which the first process (S31) is performed will be described in detail with reference to FIG. 13.

Figure 13A:
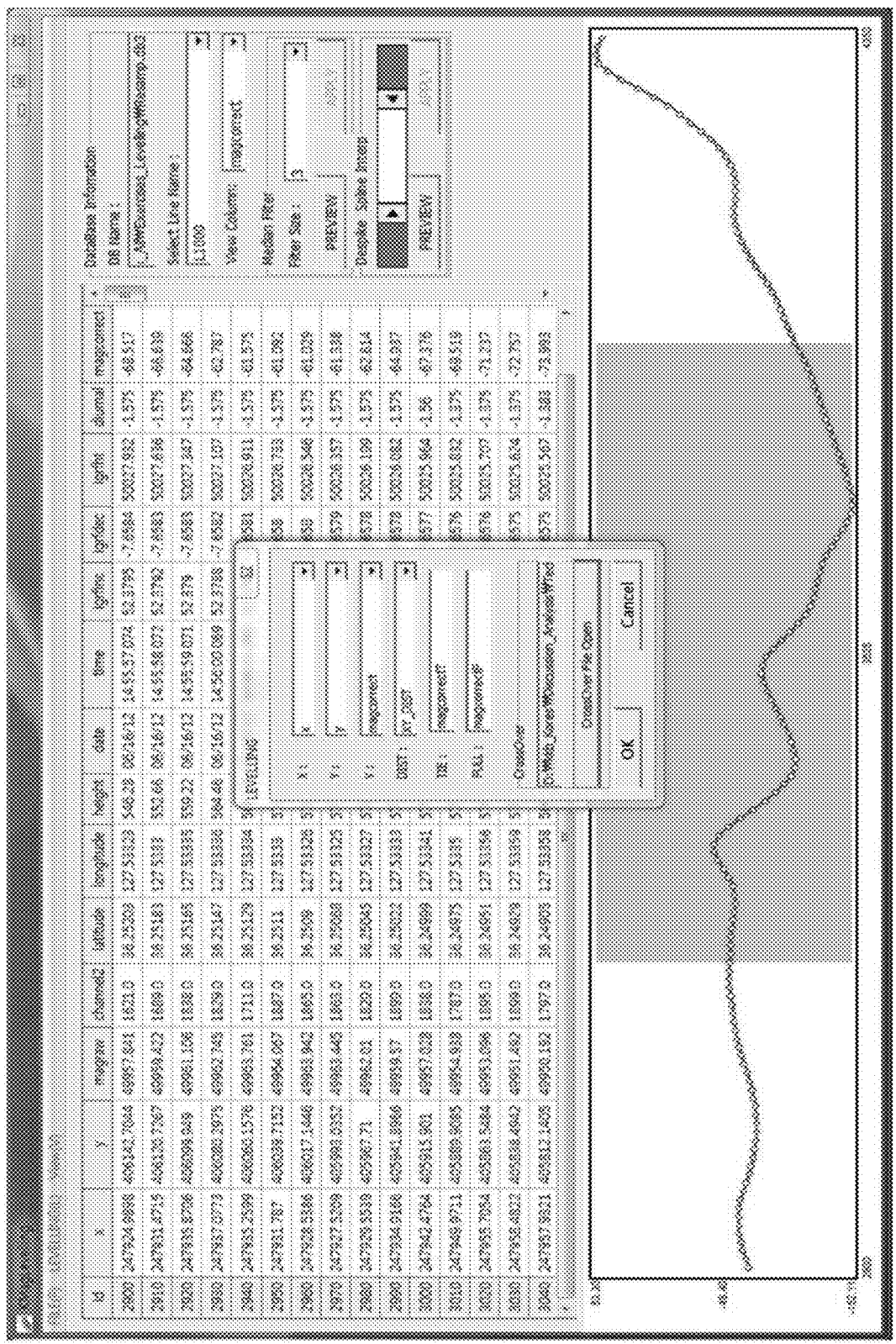
FIG. 13A illustrates a window for inputting a conventional leveling variable during a process of performing conventional leveling as an important processing process of aeromagnetic data.
Figure 13B:
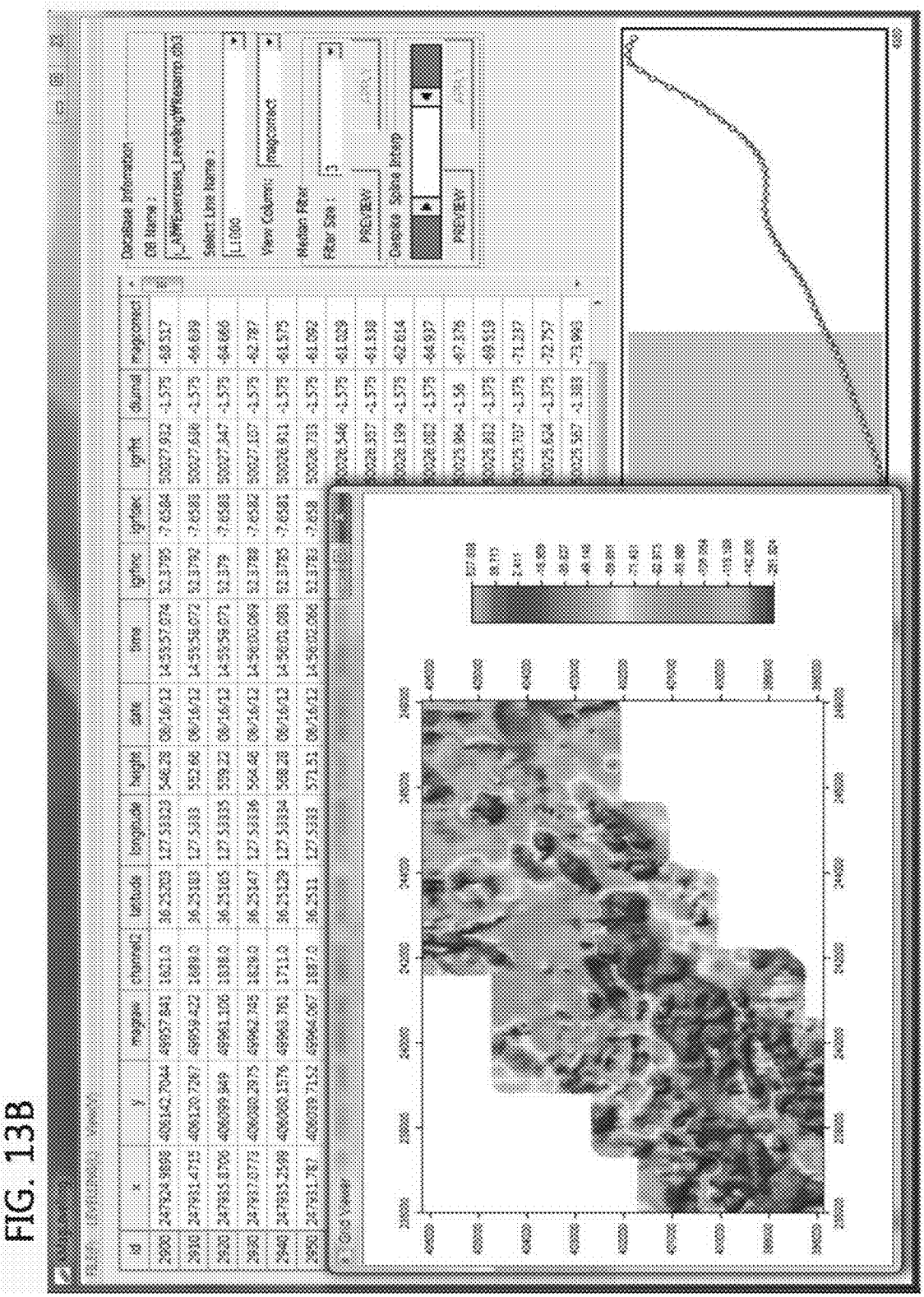
FIG. 13B illustrates that a result after the processing is visualized.

FIG. 13A illustrates a window for inputting a conventional leveling variable during a process of performing conventional leveling as an important processing process of aeromagnetic data, and FIG. 13B illustrates that a result after the processing is visualized.

The conventional leveling is an experiential data processing process. Hence the conventional leveling is repeatedly performed several times until a result determined as an optimum result by the user is derived, and results obtained whenever the conventional leveling is performed are sequentially stored in the address specification integrated DB 123 and simultaneously visualized, thereby waiting for a user's decision.

In this case, as an example, a result of the conventional leveling, which the user decides as an optimum result by repeatedly performing the conventional leveling several time, is illustrated in FIG. 13B.

Next, in the third process (S33), micro leveling is performed.

Here, that the micro leveling is additionally performed is provided for the purpose of correcting a wrinkle effect that still remains along the survey line after the conventional leveling.

Next, in the fourth process (S34), it is determined whether the user has derived an optimum result as the result obtained by performing the third process (S33).

Like the conventional leveling, the fourth process (S34) is also an experiential data processing process. Hence, the micro leveling is repeatedly performed several times until the user derives a result determined as an optimum result.

If it is not determined that the user has derived the optimum result in the fourth process (S34) (No), the third step (S30) returns to the third process (S33). If it is determined that the user has derived the optimum result in the fourth process (S34) (Yes), the third step (S30) proceeds to the fifth process S35 of generating a magnetic anomaly map for analysis, which is a final process.

Figure 14A:
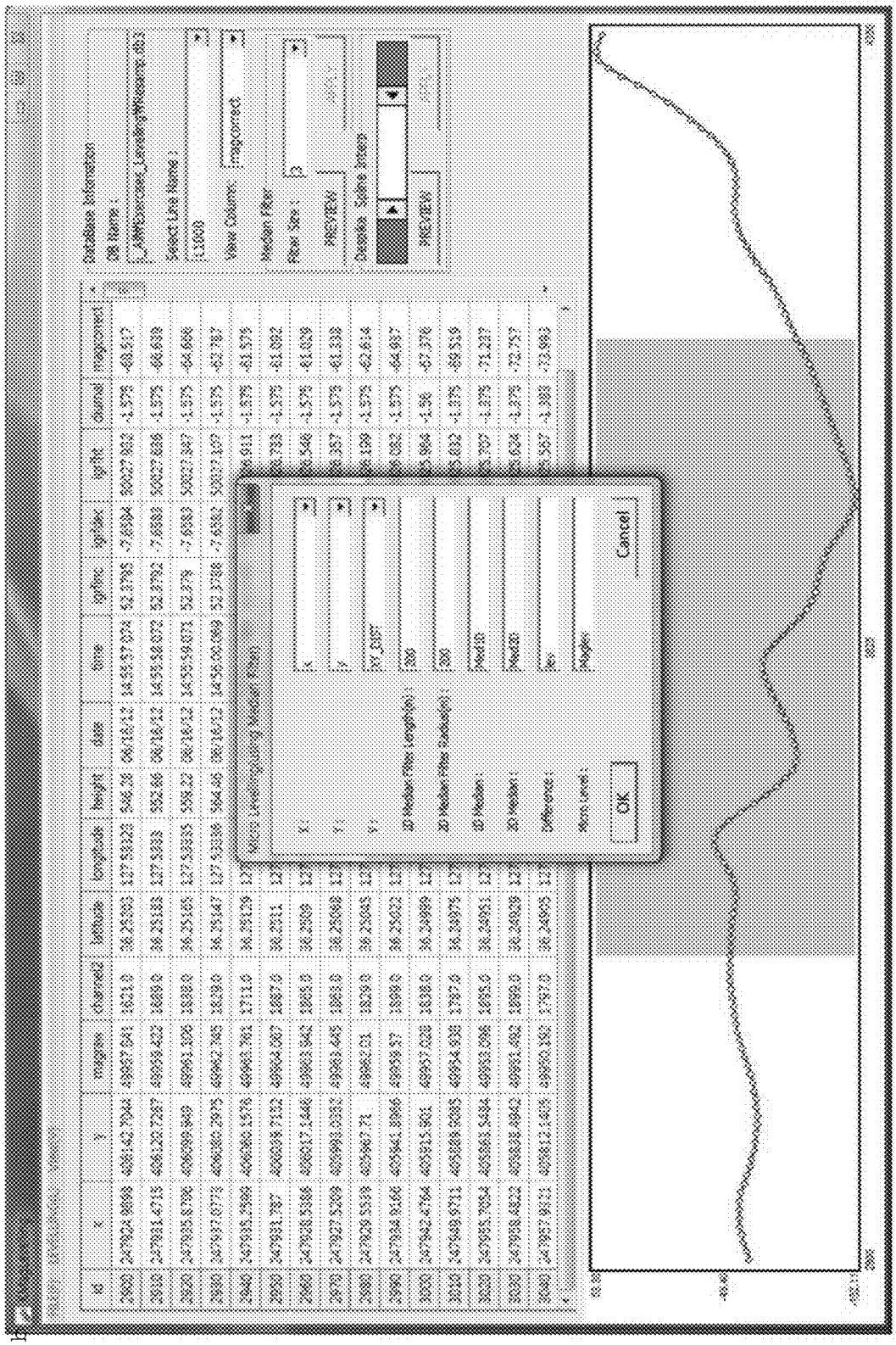
FIG. 14A illustrates an input variable window for performing micro leveling for correcting a wrinkle effect along a survey line.
Figure 14B:
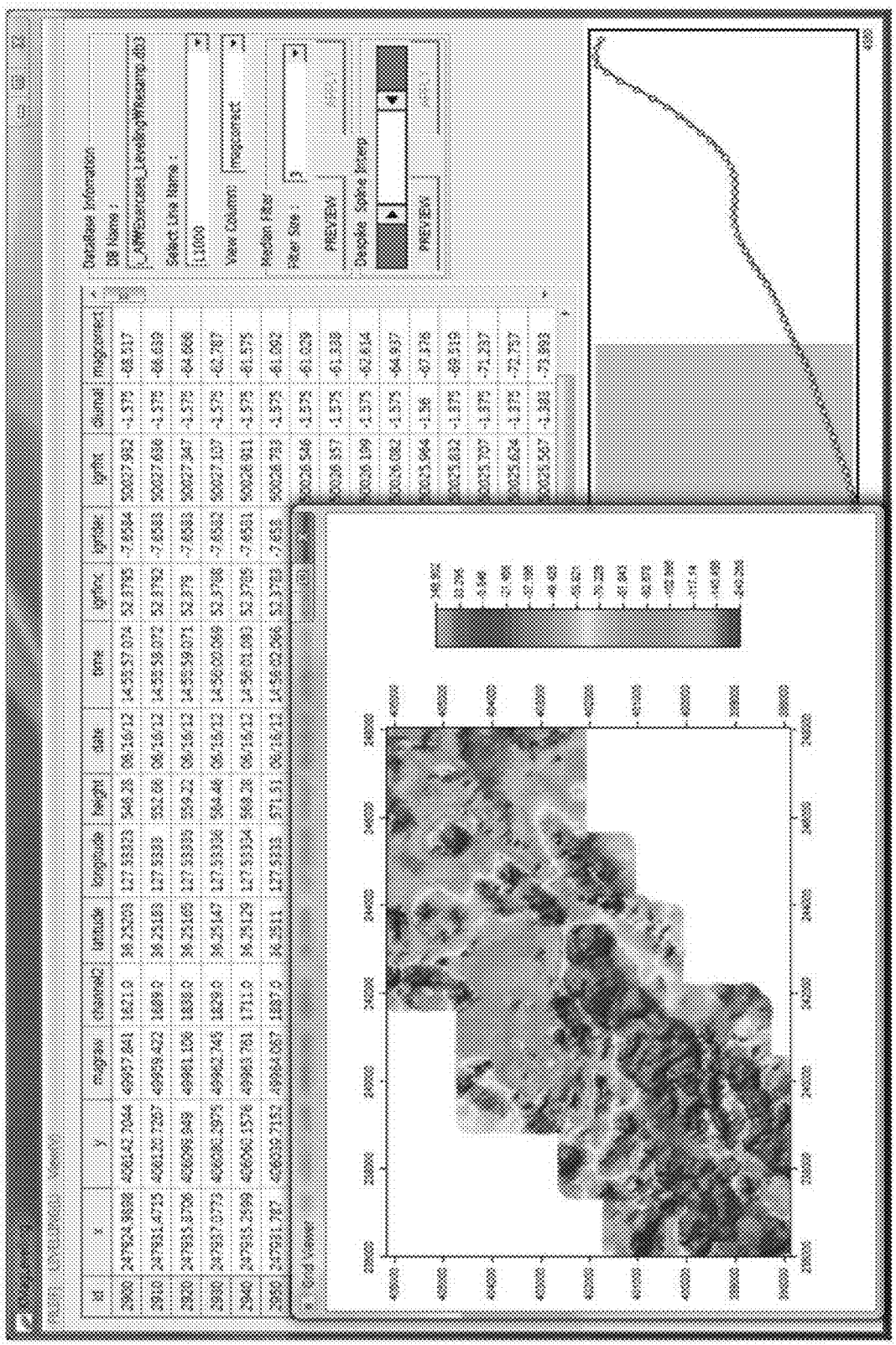
FIG. 14B illustrates that a result after the micro leveling is visualized.

In this case an input variable window for performing micro leveling for correcting a wrinkle effect which still remains along the survey line is illustrated as an embodiment in FIG. 14A, and a magnetic anomaly map generated after the micro leveling is illustrated as an embodiment in FIG. 14B.

In the present invention, a movable differential median filtering technique is used as an algorithm for performing the micro leveling. The movable differential filtering technique is a technique of simultaneously applying 1D median filtering in the survey direction and 2D median filtering using, as an input, data of a survey group included in a 2D window. Thus, it is possible to derive a relatively satisfactory result even when a survey path is irregular.

According to the present invention, it is possible to remarkably reduce the consumption of time and effort due to users' inevitable manual work or the use of an interface difficult to be handled, as compared with the conventional art, thereby providing users with an efficient pre-processing operation of aeromagnetic data.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An aeromagnetic pre-processing system based on a graphic user interface (GUI), comprising:
   one or more units and databases being configured and executed by a processor using algorithm which associated with least one non-transitory storage device, the algorithm which when executed, causes the processor to perform the one or more units, the one or more units comprising:
   an input unit for receiving at least one of measured aeromagnetic data, GPS data, and reference magnetic data;
   a data storage unit for storing individual data, collection data, and edition data with respect to division area data groups, the division area data groups being obtained subsequent to an investigation area being divided, the investigation area being represented as a solid-line polygon;
   a division data group database (DB) associated with the processor for individually storing each the division area data groups;
   an integrated DB associated with the processor for constituting the collected division data groups as an integrated DB by collecting and storing each of the division area data groups; and
   an address specification integrated DB associated with the processor for removing survey data beyond the investigation area and unnecessary data corresponding to an overlapping or irregular flight within the investigation area, for providing an address to every survey, and then for storing the surveys,
   a GUI providing unit for providing a GUI for data input/output;
   an operation unit for pre-processing for each of the division area data groups and collecting editing and leveling data of the division area data groups; and
   a display unit for visualizing the division data groups in the form of flight paths by using data groups of each of the division data group database (DB), integrated DB, and address specification integrated DB, the division data groups being displayed by reducing consumption of time and effort due to user's inevitable manual thereby providing the user with an efficient pre-processing operation of aeromagnetic data.

2. The aeromagnetic pre-processing system of claim 1, wherein the operation unit comprises:

a pre-processing operation unit for performing a pre-processing operation for each of the division area data groups with respect to the aeromagnetic data, GPS data, and reference magnetic data, which are read through the input unit;

an integrated DB operation unit for performing an operation to generate an integrated DB by collecting the division area data groups; and a leveling operation unit for performing an operation to implement conventional leveling and micro leveling.

3. A computer-implemented pre-processing method using an aeromagnetic pre-processing system based on a GUI, the pre-processing method comprising:

reading measured aeromagnetic data, GPS data, and reference magnetic data for each division data groups;

synchronizing the aeromagnetic data, GPS data, and reference magnetic data, the synchronized data having the same recording time;

transforming GPS information represented with latitude and longitude to Transverse Mercator (TM) or Universe Transverse Mercator (UTM);

performing correction of a delay corresponding to transceiver spacing and a heading effect corresponding to different flight directions;

constituting an integrated DB by collecting all division data groups stored in a division data group DB of a data storage unit;

removing unnecessary data beyond an investigation area;

selectively removing unnecessary data within the investigation area;

performing specification and edition of an address for each survey of the integrated DB;

performing conventional leveling; and performing micro levelling, wherein removing the unnecessary data beyond an investigation area is performed by configuring the investigation area as a combination of polygonal coordinates in a looped curve shape, and the combination of the polygonal coordinates is overlapped with the aeromagnetic data visualized as the flight paths, separating all aeromagnetic data into internal and external data, and selectively removing unnecessary external area data, and wherein all aeromagnetic data stored in the integrated DB are visualized as flight paths, and the visualized flight paths are provided to a user.

4. The pre-processing method of claim 3, wherein, in order to remove an undesired portion due to an overlapping or irregular flight path within the investigation, area all surveys are separated into segmented survey groups by introducing segment points having a finite number, and a corresponding segment survey to be removed is selectively removed by using a mouse.

5. The pre-processing method of claim 3, wherein, one survey in the south/north or east/west direction is arbitrarily specified, and separated into surveys by allowing the user to determine whether the one survey is a survey line or tie line, and an address is specified with respect to each of the separated surveys.

6. The pre-processing method of claim 3, wherein a feedback process for allowing the user to derive an optimum result through repetitive trials and errors.

* * * * *